United States Patent
Krishnan et al.

(10) Patent No.: US 11,164,339 B2
(45) Date of Patent: Nov. 2, 2021

(54) FAST REGION OF INTEREST CODING USING MULTI-SEGMENT TEMPORAL RESAMPLING

(71) Applicant: Sony Interactive Entertainment Inc., Tokyo (JP)

(72) Inventors: Rathish Krishnan, Los Gatos, CA (US); Jason N. Wang, Pleasanton, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/721,733

(22) Filed: Dec. 19, 2019

(65) Prior Publication Data

US 2021/0142520 A1    May 13, 2021

Related U.S. Application Data

(60) Provisional application No. 62/934,284, filed on Nov. 12, 2019.

(51) Int. Cl.
  *G06K 9/00* (2006.01)
  *G06T 9/00* (2006.01)
  (Continued)

(52) U.S. Cl.
  CPC .............. *G06T 9/00* (2013.01); *G06T 3/4007* (2013.01); *G06T 5/002* (2013.01); *G06T 5/20* (2013.01);
  (Continued)

(58) Field of Classification Search
  CPC ........ H04N 7/50; H04N 7/30; H04N 7/26244; H04N 7/26313; H04N 7/26106;
  (Continued)

(56) References Cited

U.S. PATENT DOCUMENTS 5,696,848 A * 12/1997 Patti ...................... G06T 3/4053
                                                        348/E5.062
6,252,989 B1    6/2001 Geisler et al.
(Continued)

FOREIGN PATENT DOCUMENTS

| GB | 2404105 A | 1/2005 |
|---|---|---|
| WO | 2010137104 A1 | 12/2010 |
| WO | 2017158236 A3 | 11/2017 |

OTHER PUBLICATIONS

"3D Face Pose Estimation from a Monocular Camera" by Qiang Ji and Ruong Hu in Image and Vision Computing, vol. 20, Issue 7, Feb. 20, 2002, pp. 499-511.

(Continued)

*Primary Examiner* — Amir Alavi
(74) *Attorney, Agent, or Firm* — JDI Patent; Joshua D. Isenberg; Robert Pullman

(57) ABSTRACT

A method, system and computer readable instructions for video encoding comprising, determining one or more region of interest (ROI) parameters for pictures in a picture stream and a temporal down sampling interval. One or more areas outside the ROI in a picture in the picture stream are temporally down sampled according to the interval. The resulting temporally down sampled picture is then encoded and the encoded temporally down-sampled picture is transmitted. Additionally, a picture encoded in this way in an encoded picture stream may be decoded and areas outside an ROI of the picture may be temporally up sampled. The temporally up sampled areas outside the ROI are inserted into the decoded encoded picture stream.

41 Claims, 19 Drawing Sheets

(51) Int. Cl.
*G06T 3/40* (2006.01)
*G06T 5/20* (2006.01)
*H04N 19/176* (2014.01)
*H04N 19/167* (2014.01)
*H04N 19/132* (2014.01)
*G06T 5/00* (2006.01)

(52) U.S. Cl.
CPC ......... *H04N 19/132* (2014.11); *H04N 19/167* (2014.11); *H04N 19/176* (2014.11)

(58) Field of Classification Search
CPC .. H04N 1/3935; H04N 1/393; H04N 1/40068; G06T 3/40; G06T 3/4007; G06T 3/4023; G06T 3/4053
See application file for complete search history.

(56) References Cited

U.S. PATENT DOCUMENTS

| | | | | |
|---|---|---|---|---|
| 6,327,000 | B1* | 12/2001 | Auld | G06T 3/4007 |
| | | | | 348/441 |
| 6,623,428 | B2 | 9/2003 | Miller et al. | |
| 6,909,745 | B1* | 6/2005 | Puri | H04N 19/70 |
| | | | | 348/384.1 |
| 7,643,690 | B2* | 1/2010 | Suzuki | G06T 5/003 |
| | | | | 382/236 |
| 8,024,768 | B2* | 9/2011 | Berger | H04N 21/4728 |
| | | | | 725/146 |
| 8,036,494 | B2* | 10/2011 | Chen | G06T 7/215 |
| | | | | 382/299 |
| 8,218,641 | B2 | 7/2012 | Wang | |
| 8,374,456 | B2* | 2/2013 | Vetro | H04N 13/10 |
| | | | | 382/260 |
| 8,385,663 | B2* | 2/2013 | Xu | G06K 9/6251 |
| | | | | 382/225 |
| 8,442,318 | B2 | 5/2013 | Knee et al. | |
| 8,565,478 | B2* | 10/2013 | van Eekeren | G06T 3/4053 |
| | | | | 382/103 |
| 8,711,933 | B2 | 4/2014 | Lee | |
| 8,879,623 | B2 | 11/2014 | Lee | |
| 9,386,317 | B2 | 7/2016 | Lee | |
| 10,372,205 | B2 | 8/2019 | Young et al. | |
| 10,873,737 | B1* | 12/2020 | Kim | H04N 7/08 |
| 2003/0189579 | A1 | 10/2003 | Pope | |
| 2008/0310501 | A1 | 12/2008 | Ward et al. | |
| 2009/0153730 | A1 | 6/2009 | Knee et al. | |
| 2011/0051806 | A1 | 3/2011 | Lee | |
| 2011/0141365 | A1 | 6/2011 | Park et al. | |
| 2011/0235706 | A1 | 9/2011 | Demircin et al. | |
| 2012/0114039 | A1 | 5/2012 | Wang | |
| 2012/0212631 | A1 | 8/2012 | Klirenko et al. | |
| 2014/0044189 | A1 | 2/2014 | Pearlstein | |
| 2014/0125694 | A1 | 5/2014 | Kaplan | |
| 2014/0270553 | A1 | 9/2014 | Zund et al. | |
| 2015/0085097 | A1 | 3/2015 | Larsen | |
| 2015/0085250 | A1 | 3/2015 | Larsen | |
| 2015/0085251 | A1 | 3/2015 | Larsen | |
| 2015/0229945 | A1 | 8/2015 | Nakagami et al. | |
| 2015/0365687 | A1 | 12/2015 | Le Floch et al. | |
| 2016/0358341 | A1* | 12/2016 | Li | G06T 7/90 |
| 2017/0285736 | A1 | 10/2017 | Young et al. | |
| 2018/0192058 | A1 | 7/2018 | Chen et al. | |
| 2018/0376153 | A1* | 12/2018 | Gokhale | H04N 19/137 |
| 2019/0379893 | A1 | 12/2019 | Krishnan | |

OTHER PUBLICATIONS

"An Algorithm for Real-time Stereo Vision Implementation of Head Pose and Gaze Direction Measurement", by Yoshio Matsumoto and Alexander Zelinsky in FG '00 Proceedings of the Fourth IEEE International Conference on Automatic Face and Gesture Recognition, 2000, pp. 499-505.
"Facial feature extraction and pose determination", by Athanasios Nikolaidis Pattern Recognition, vol. 33 (Jul. 7, 2000) pp. 1783-1791.
"Head Pose Estimation in Computer Vision: A Survey" by Erik Murphy, in IEEE Transactions on Pattern Analysis and Machine Intelligence, vol. 31, No. 4, Apr. 2009, pp. 607-626.
"What is Optical Flow and why does it matter in deep learning", by Mark Gituma, downloaded from.
B. Patrão, S. Pedro, P. Menezes, How to Deal with Motion Sickness in Virtual Reality, Sciences and Technologies of Interaction (SciTecIN'15), EPCGI'2015: The 22nd Portuguese Conf. on Computer Graphics and Interaction, Coimbra, Portugal, 2015.
Kienzle W., Schölkopf B., Wichmann F.A., Franz M.O. (2007) How to Find Interesting Locations in Video: A Spatiotemporal Interest Point Detector Learned from Human Eye Movements. In: Hamprecht F.A., Schnörr C., Jähne B. (eds) Pattern Recognition. DAGM 2007. Lecture Notes in Computer Science, vol. 4713. Springer, Berlin, Heidelberg.
Sanchez et al. "Prioritized region of interest coding in JPEG2000." In: IEEE Transactions on 1-18 Circuits and Systems for Video Technology. Aug. 24, 2004 (Aug. 24, 2004) Retrieved on Sep. 22, 2019 (Sep. 22, 2019) from entire document.
U.S. Appl. No. 62/934,284 to Rathish Krishnan et al., filed Nov. 12, 2019.
International Search Report and Written Opinion for International Patent Application No. PCT/US202/056442.

* cited by examiner

FAST REGION OF INTEREST CODING USING MULTI-SEGMENT TEMPORAL RESAMPLING

CLAIM OF PRIORITY

This application claims the priority benefit of U.S. Provisional Patent Application No. 62/934,284 to Rathish Krishnan et al., filed Nov. 12, 2019 and entitled "FAST REGION OF INTEREST CODING USING MULTI-SEGMENT TEMPORAL RESAMPLING", the entire contents of which are incorporated herein by reference.

FIELD OF THE DISCLOSURE

Aspects of the present disclosure are related to digital image encoding and decoding. In particular, the present disclosure relates to Region of Interest coding.

BACKGROUND

In video processing, Region of Interest (ROI) coding typically refers to the process of boosting the visual quality of a selected portion of a video frame relative to the rest of the video frame. ROI coding can be used for bandwidth reduction, and ensuring that visual fidelity in important parts of a scene is maintained during network congestion.

Traditional ROI coding involves manipulating the quantization parameter (QP) during the encoding process so that a lower QP is used for areas inside the ROI and a higher QP is used for the rest. This results in reducing the share of bits for the areas outside the ROI, which in turn lowers the picture quality of the background. While this approach can lower the bitrate, it does not speed up the encoding process as it does not reduce the number of pixels that are processed.

Some existing non-uniform resampling methods apply a transformation function to the entire image, which might result in a non-rectangular image that is not suited for popular image and video compression standards. For coding a non-rectangular pixel arrangement, a rectangular bounding box is used with padded pixels, and the padded rectangular image is then compressed using traditional means. This too is suboptimal as the encoder may need to process padded pixels that will not be displayed.

Other approaches might utilize two separate bit streams, one for the ROI and another for the background. The background may be down sampled to a lower resolution to reduce the encoding time. The final image is generated by blending the ROI over the background. The disadvantage of this method is that two encoder instances are needed to generate two bit streams. At the display side, two decoder instances are needed and additional synchronization is needed which increases complexity.

It is within this context that aspects of the present disclosure arise.

DETAILED DESCRIPTION

Introduction

Figure 1A:
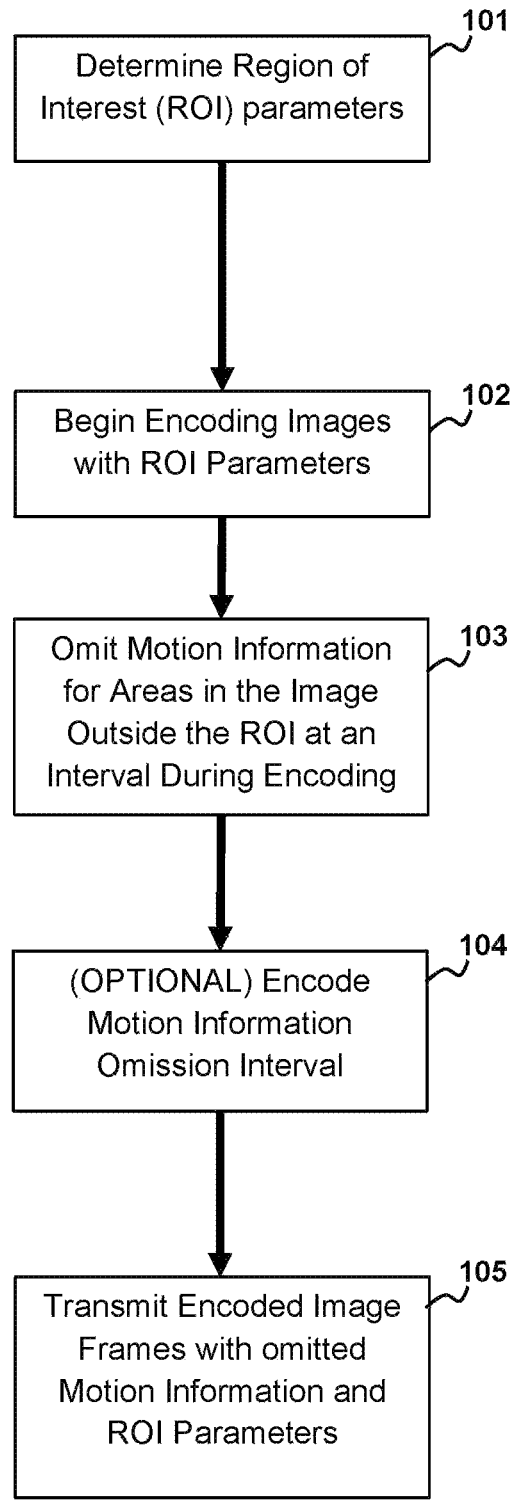
FIG. 1A shows a method for encoding with temporal down sampling or motion information according to aspects of the present disclosure.

A new method of performing ROI coding uses temporal down sampling to reduce the bit count of an image during transmission without loss of detail in the ROI. The reduced bit count speeds up the encoding process that produces the compressed bit stream and reduces the bandwidth required to transmit the encoded picture data. On the decoder side, the compressed bit stream is temporally up sampled during decompression to reconstruct the image to a near facsimile of the original image at the original resolution. The proposed method achieves ROI coding while reducing the time needed to perform encoding and reduces the size of the compressed image stream substantially.

As used herein, "temporal down sampling" refers to a reduction of the encoded bit count for an image frame or portion of an image frame during a time interval (called the temporal down sampling interval) by eliminating information about the image frame or portion of the image frame used during compression. Additionally as used herein "temporal up sampling" refers to generation of information for an image frame or portion of the image frame that is present in the encoded images during the temporal down sampling interval.

The proposed solution has several advantages over existing ROI coding techniques. The proposed solution heavily reduces the bit count of the encoded input images during a temporal down sampling interval without loss of detail in the ROI, leading to faster encoding. ROI coding using the proposed solution can be performed using existing compression standards. Adjusting the QP to control the picture quality of the ROI and the background can be avoided. ROI coding using the proposed solution can be implemented using a single encoder instance. The proposed solution allows for varying the ROI size and position between video frames. The proposed solution also allows control of the picture quality difference between the ROI and the background. Furthermore, some aspects of the proposed solution may be extended to non-rectangular ROIs and to multiple ROIs in the same image.

Methodology

Temporal down sampling as discussed above substantially reduces the bit count of frames inside the temporal down sampling interval. This allows for more efficient encoding and transmission of frames. Combining temporal down sampling with ROI encoding allows for high fidelity or more accurate rendering of areas of the image where a viewer is looking and a lower fidelity or less accurate rendering of areas where the viewer has less perceptive ability.

One approach to temporal down sampling is to reduce the motion information for areas outside the ROI. By way of example, and not by way of limitation, motion information may include motion vectors, information identifying a picture to which a motion vector refers, a section size, e.g., a block size, that a motion vector covers, or some combination of two or more of these.

It is useful to briefly describe two examples of down/up sampling methods before going into their details. A first method is referred to herein as in-loop down/up sampling. According to this method, down sampling on the encoder side is part of the encoding loop and up-sampling on the decoder side is part of the decoding loop. In this method the encoder omits or partially omits motion information for regions outside the ROI for pictures within a down sampling interval. The decoder up samples motion information before using the motion information to reconstruct the decoded pixels.

In the second method, the encoder either encodes still pixels or omits pixels outside ROI for pictures within down sampling interval. Then, the decoder decodes compressed pictures first. After the pictures are decompressed, the decoder temporally up-samples the decoded pixels. Because down-sampling happens before encoding and up-sampling happens after decoding, down-sampling and up-sampling can be regarded as happening outside of the encoding/decoding loop. This method is therefore referred to herein as out-of-loop up/down sampling.

FIG. 1A shows a method for encoding with temporal in-loop down/up sampling of motion information according to aspects of the present disclosure. ROI parameters related, e.g., to the size, location, and shape of the ROI may be determined, as indicated at 101. By way of example and without limitation, in the case of a rectangular ROI these parameters may include offsets from each edge of a rectangular image to a corresponding ROI boundary as well as dimensions, e.g., length and width, for the image and the ROI. More information regarding determining the ROI parameters, pixel offsets and multi-segment spatial down sampling can be found in the co-owned co-pending application Ser. No. 16/004,271 Krishnan et al. "FAST REGION OF INTEREST CODING USING MULTI-SEGMENT RESAMPLING" the content of which are incorporated herein by reference.

Once the ROI parameters have been determined encoding images with the ROI parameters may begin, as indicated at 102. Encoding of images is a multi-step process as will be discussed in a later section. The multi-step process includes calculation of motion information such as motion vectors for each image and related information. The ROI parameters may be included with this encoding step to ensure that they are available during the decoding process. According to aspects of the present disclosure, the method may use the ROI parameters to determine the ROI and omit calculation of the motion information for areas outside the ROI at a temporal down sampling interval, as indicated at 103. According to aspects of the present disclosure, the beginning and ending frames of the temporal down sampling interval may retain the motion information for portions outside the ROI to ensure that motion information for the other frames in the temporal down sampling interval can be regenerated. Additional frames within the temporal down sampling interval may retain their motion information outside the ROI, for example and without limitation areas with motion information of great magnitude or areas with a recognized motion pattern. Temporal down sampling simplifies motion prediction outside the ROI and thereby speeds up the encoding process. Some implementations may additionally use pattern recognition to eliminate some motion vectors and reduce complexity of an encoder's motion prediction.

In some implementations, according to aspects of the present disclosure, the temporal down sampling interval may be included with the encoded image frames as indicated at 104. After the encoding process is completed, encoded image frames may be transmitted to a client, another memory location or another device, as indicated at 105. Such transmission may involve, e.g., a data bus within a device, a wide area network (WAN), such as the internet, a local area network (LAN), or a personal area network (PAN), such as a Bluetooth network.

Figure 1B:
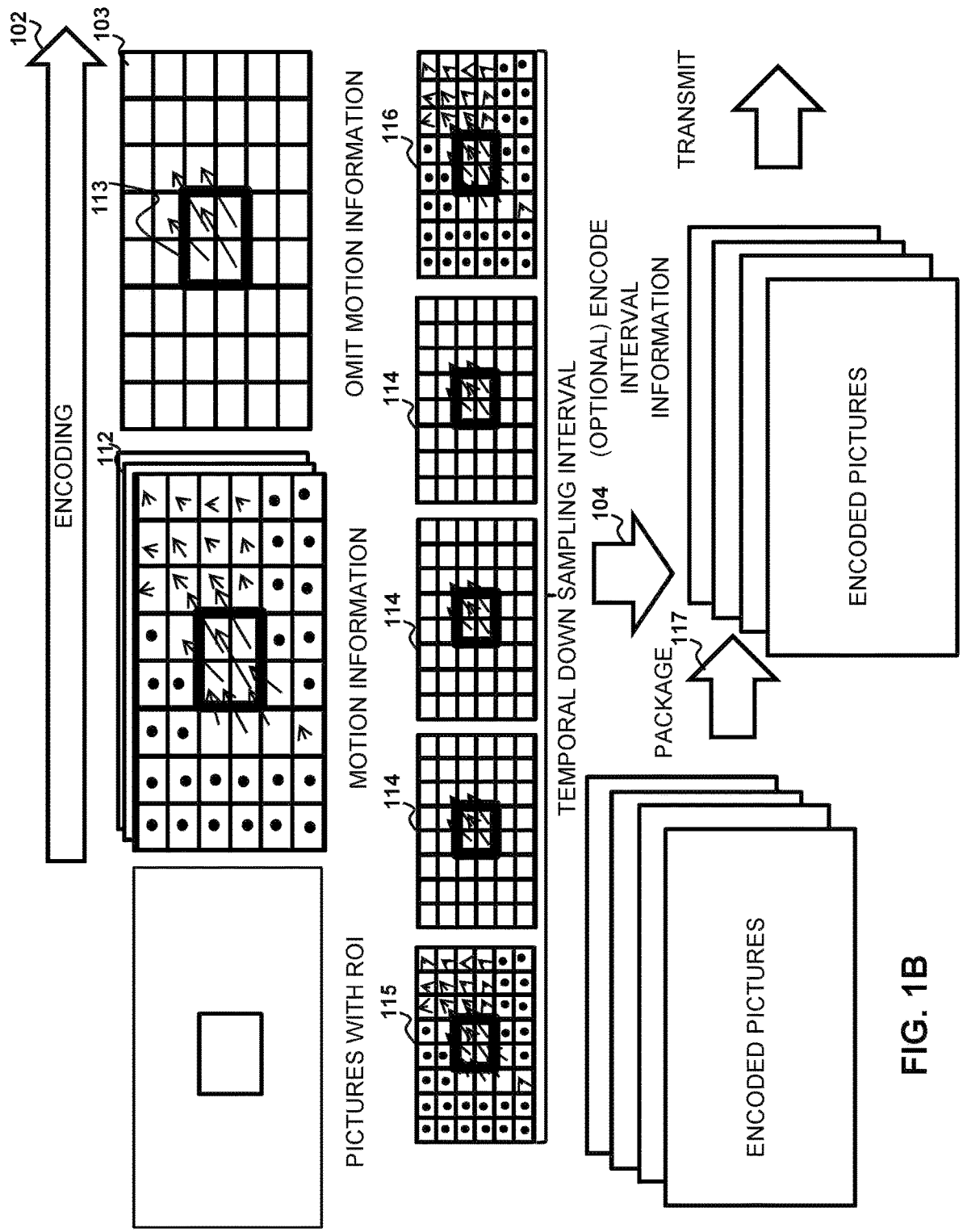
FIG. 1B is a graphical depiction of the method for encoding with temporal down sampling or motion information according to aspects of the present disclosure.

FIG. 1B graphically depicts the method described above with respect to FIG. 1A. As shown during the encoding process at 102 motion vectors are generated for image frames 112. In the simplified depiction shown an arrow represents a motion vector generated for each section of an image, represent by the grid. Motion information down sampling at 103 may remove the motion information from areas outside the ROI 113. Alternatively, the motion information for areas outside the ROI may simply not be calculated during the encoding process (not shown). The data for the ROI 113 as shown may retain motion information such as, without limitation, motion vectors. The motion information for one or more areas outside the ROI for a stream of pictures may be removed at a temporal down sampling interval. The beginning picture 115 and ending picture 116 of the temporal down sampling interval may retain their motion information while all other intermediate pictures 114 have their motion information omitted, e.g., not calculated, or removed.

The information describing the temporal down sampling interval may be encoded with the pictures or separately 104. In alternative embodiments the temporal down sampling information may be packaged with the encoded pictures in for example and without limitation, Network Abstraction Layer (NAL) encoding.

In some alternative implementations according to aspects of the present disclosure, the temporal down sampling interval may be a fixed interval chosen to minimize encoding delay and bandwidth required to transmit encoded images without loss of quality. In such implementations both the encoder and decoder may simply retain the temporal down sampling interval and no temporal down sampling interval information need be transmitted between devices. In other implementations, the temporal down sampling interval may be variable and, as such, the encoder may include some temporal down sampling information with the encoded picture data. In yet other implementations, the temporal down sampling interval information may simply be a preset interval known to the decoder. In some implementations, the temporal down sampling interval may depend on a distance of a region relative to the ROI. There may be multiple regions of an image around the ROI. A region closer to ROI may take smaller down sampling interval than a region further away from the ROI.

Figure 2:
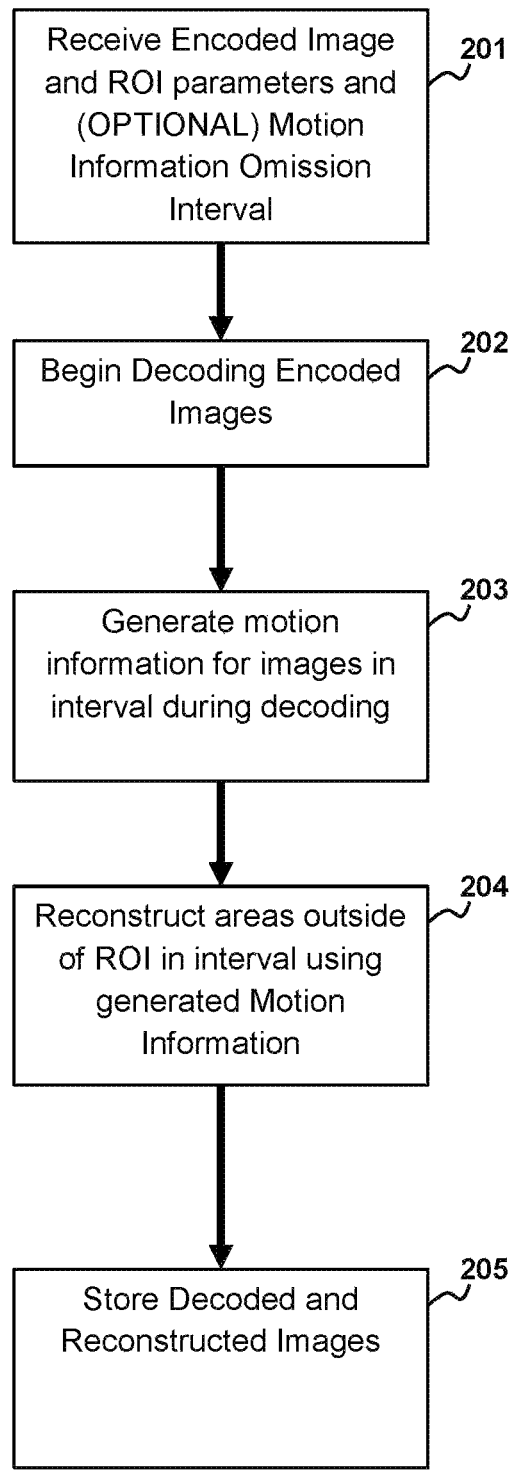
FIG. 2 depicts the method for decoding temporally down sampled image streams according to aspects of the present disclosure.

FIG. 2 depicts a method for decoding temporally down sampled image streams according to aspects of the present disclosure. Initially an encoded image stream may be received over a network at a device, as indicated at 201. In some implementations, the image stream may include a temporal down sampling interval encoded within the image stream or as a separate transmission. The device may begin decoding the image stream, as indicated at 202. As part of the decoding process the temporal down sampling interval may be entropy decoded and used later in the process.

In the normal decoding process encoded motion information such as motion vectors are decoded and used to reconstruct macroblock movement within the image. Due to the temporal down sampling process using motion information, the motion information outside the ROI is not present for frames within the temporal down sampling interval. As such, the omitted motion information outside the ROI must be generated or reconstructed 203. Generation of the motion information may be performed using interpolation. According to aspects of the present disclosure, the beginning and ending images in the temporal down sampling interval retain their motion information. The device may interpolate the between the motion information of the beginning frame and the motion information of the ending frame to generate interpolated motion information for each frame in the temporal down sampling interval. In some implementations, several beginning and end frames over several temporal down sampling periods may be interpolated to generate motion information. In other implementations, additional motion information during the temporal down sampling interval, such as in areas with a high magnitude of motion information, may be used during interpolation for a more accurate regeneration of the information. The interpolation may be any interpolation method known in the art for example and without limitation, linear interpolation, polynomial interpolation or spline interpolation.

After generation of motion information for the frames in the temporal down sampling interval, the motion information is applied to the corresponding frames that are missing motion information in the areas outside the ROI, as indicated at 204. The frames in the temporal down sampling interval with generated motion information can then be further processed during decoding to generate a fully decoded and reconstructed image. Data corresponding to the fully decoded image may be stored in a memory or storage device, transmitted over a network or sent to a display device and displayed on the display device, as indicated at 206.

Figure 3A:
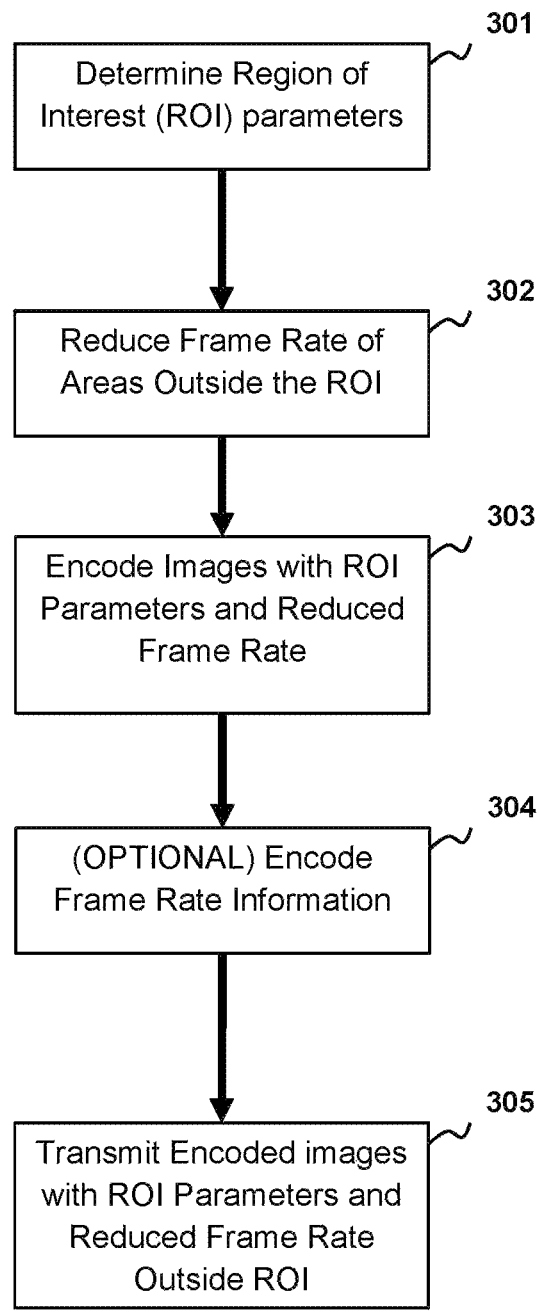
FIG. 3A depicts an alternative method for temporal down sampling according to aspects of the present disclosure.

FIG. 3A depicts an alternative method for temporal down sampling according to aspects of the present disclosure. As before, the ROI parameters related to the size, location, and shape of the ROI are determined at 301. Using the ROI parameters to locate the ROI, one or more areas outside the ROI have their frame rate decreased at 302. Here, frame rate may refer to the frequency of original pixels, generally the rate at which unduplicated chroma and luma information is available. By way of example and not by way of limitation chroma and luma information for macroblocks outside the ROI may be changed to a null value thus eliminating the image information for those macroblocks. In another example, the chroma and luma information for pixels outside the ROI are copied from previous frames. Additionally, a temporal down sampling interval may be used to determine which frames to drop. According to aspects of the present embodiment may be a frame rate or some multiple of the frame rate of one or more areas outside the ROI.

The image frames with reduced frame rate in one or more areas outside the ROI are then fully encoded at 303 using image encoding methods as will be discussed in a later section. Encoding the temporally down sampled image frame may include at least entropy coding.

In some alternative implementations, according to aspects of the present disclosure, the temporal down sampling interval may be included as metadata and encoded with each image frame or included in the image stream and encoded with the image stream, as indicated at 304. In other implementations, temporal down sampling interval information may be sent as data separate from the image stream or included as encoded data in a Network Abstraction Layer.

Finally, the encoded temporally down sampled images may be transmitted to a device, over a network or from a cache to memory 305.

Figure 3B:
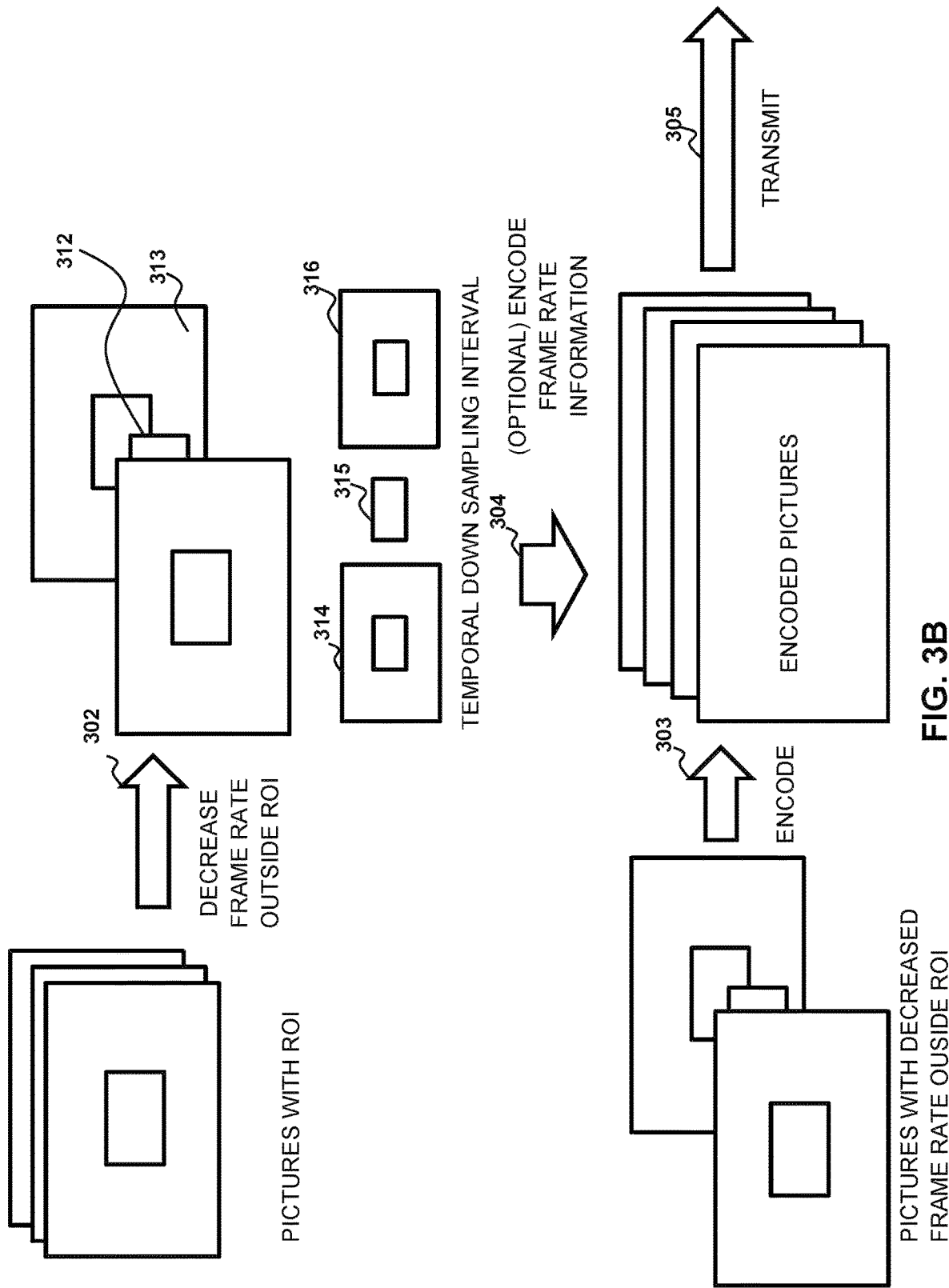
FIG. 3B graphically depicts the method for frame rate temporal down sampling according to aspects of the present disclosure.

FIG. 3B graphically depicts the above method for frame rate temporal down sampling according to aspects of the present disclosure. The pictures with ROI may have the frame rate for portions outside the ROI decreased as described above with respect to 302. As shown after decreasing the frame rate outside the ROI, ROI 312 maintains the same frame rate while the area 313 outside the ROI 312 is eliminated. The temporal down sampling interval dictates how many frames retain chroma and luma information in one or more areas around the ROI. As above the beginning frame 314 and end frame 316 in the temporal down sampling interval retain their chroma and luma information while the intermediate frame 315 only has chroma and luma information for the ROI. The pictures with reduced frame rate in one or more areas outside the ROI are then further encoded 303. The temporal down sampling interval information may be encoded with the picture 304 or packaged with the picture as part of NAL encoding. After encoding, the encoded package may be transmitted to another device or to another location on the encoding device such as storage or memory.

Figure 3C:
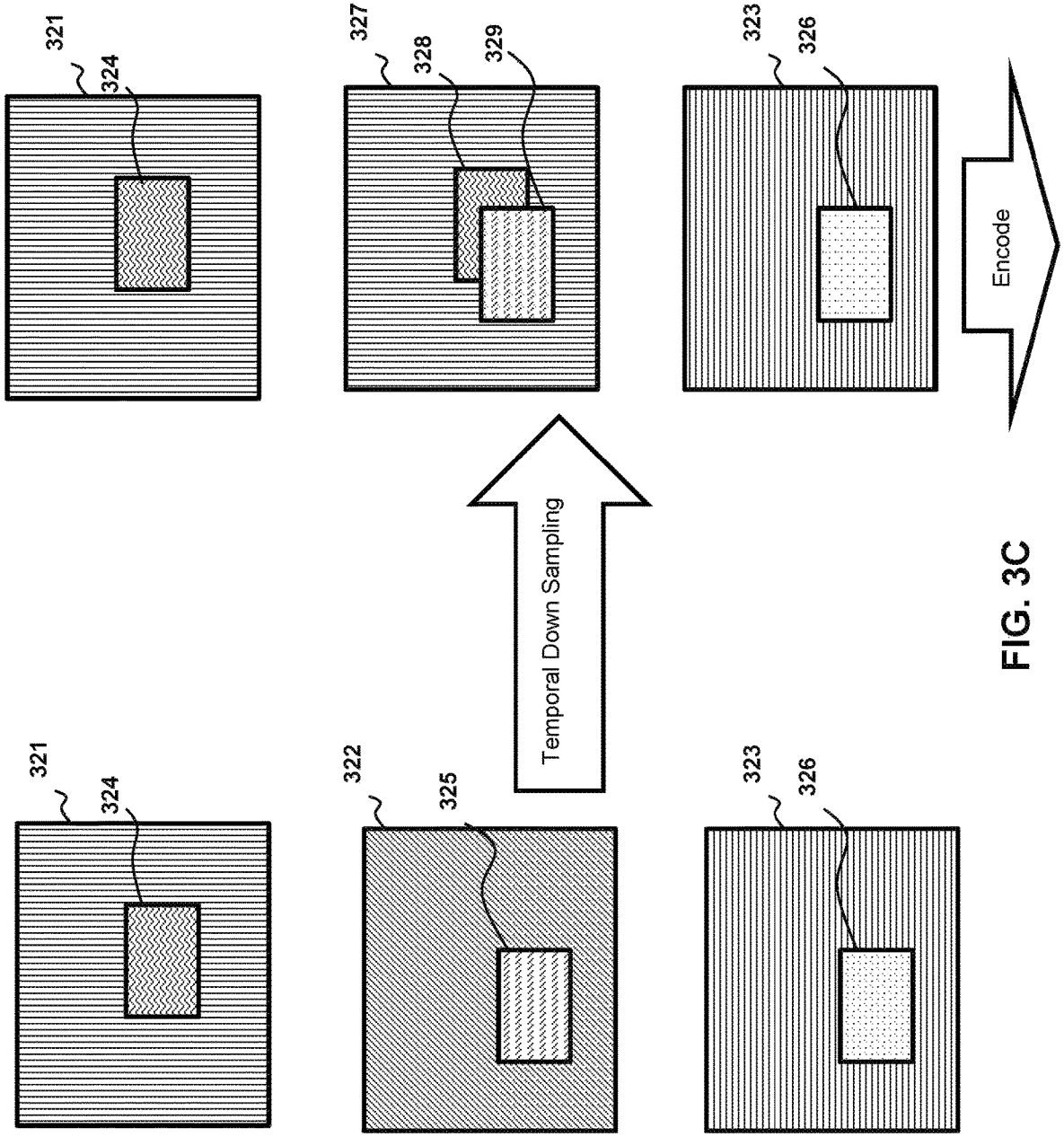
FIG. 3C graphically shows another implementation of temporal down sampling according to aspects of the present disclosure.
Figure 3D:
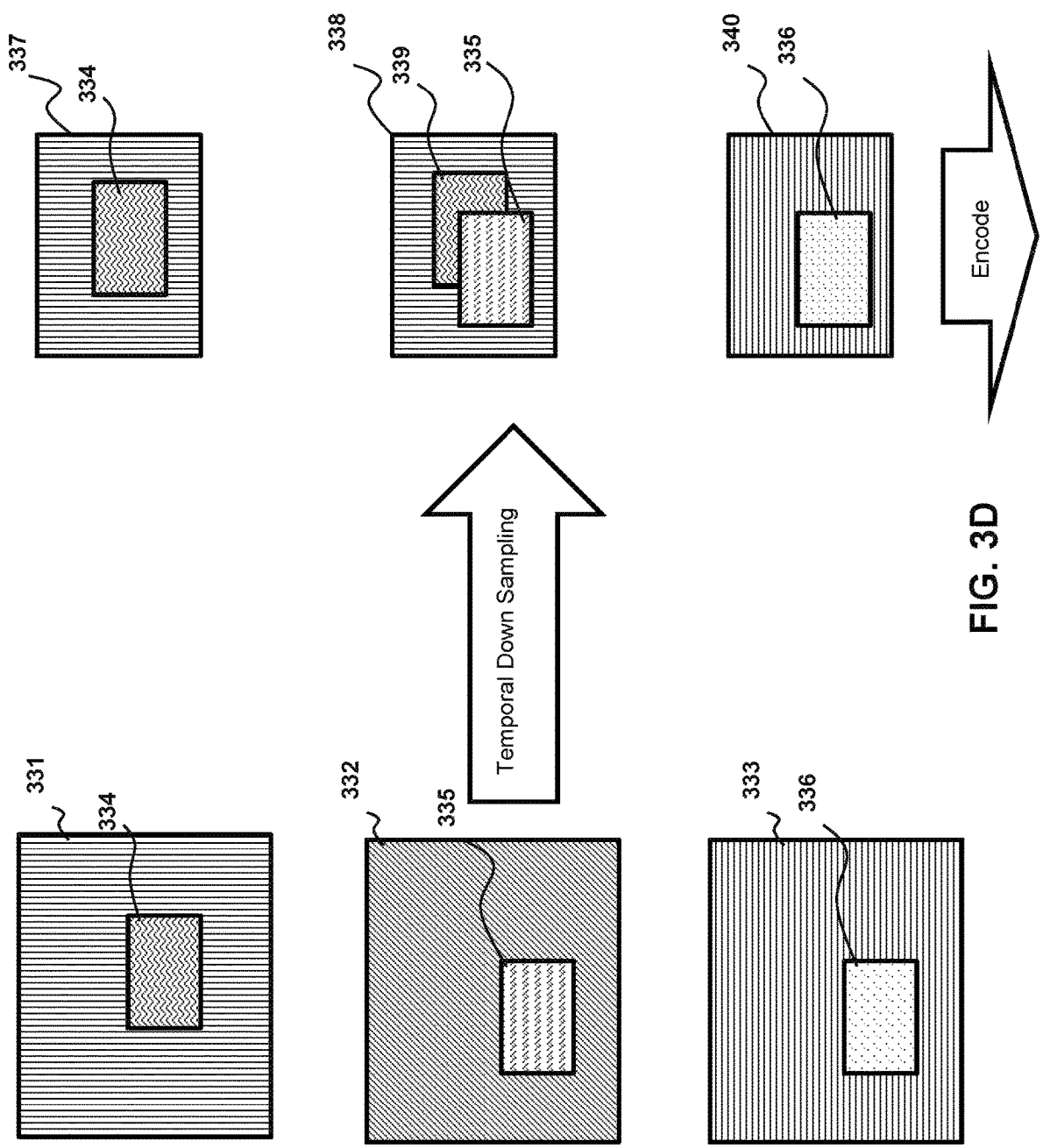
FIG. 3D graphically depicts another implementation having both temporal down-sampling and multi-segment spatial down sampling according to aspects of the present disclosure.

FIG. 3C shows another implementation of temporal down-sampling according to aspects of the present disclosure. In the shown implementation a previous frame 321, intermediate frame 322 and final frame 323 with ROI's 324, 325, 326 respectively are used in a temporal down-sampling operation. In this operation instead of eliminating chroma and luma information outside the ROI from the intermediate frame 322, the chroma and luma information from the previous frame 321 is simply repeated 327. Additionally, the ROI location moves from the previous frame 324 to the intermediate frame 325. During temporal down sampling chroma and luma information in the ROI of the previous frame 324 is combined with the chroma and luma information for intermediate frame 325 to generate the missing information for areas 328 outside the ROI 329 in the down sampled intermediate frame. The chroma and luma values in the ROI replace any chroma and luma values that may be present from outside the ROI in the previous frame. The patterns shown in FIG. 3C and FIG. 3D represent original chroma and luma information for a frame, where new patterns represent new chroma and luma information. After temporal down sampling the frames may be encoded.

FIG. 3D depicts another implementation having both temporal down-sampling and multi-segment spatial down sampling. In the shown implementation a previous frame 331, intermediate frame 332 and final frame 333 with ROI's 334, 335, 336 respectively are used in a temporal down-sampling operation. In this operation as before instead of eliminating chroma and luma information outside the ROI from the intermediate frame 332, the chroma and luma information outside the ROI from the previous frame 331 is duplicated in the temporally down sampled intermediate frame 337. The areas outside the ROI after multi-segment down sampling in the previous frame 337, intermediate frame 340 and final frame are reduced due to the multi-segment down sampling operation. Additionally, as shown the ROI location moves from the previous frame 324 to the intermediate frame 325. During temporal down sampling and multi-segment down sampling chroma and luma information in the ROI of the previous frame 334 is combined with the chroma and luma information for intermediate frame 335 to generate the missing information for areas 339 outside the ROI 335 in the down sampled intermediate frame. The chroma and luma values in the ROI replace any chroma and luma values that may be present from outside the ROI in the previous frame. Multi-segment down-sampling is not applied to the section frame containing the ROI and as such the spatial resolution of the previous ROI 339 location in the intermediate frame is retained. After temporal down sampling and multi-segment down sampling the frames may be encoded.

Figure 4A:
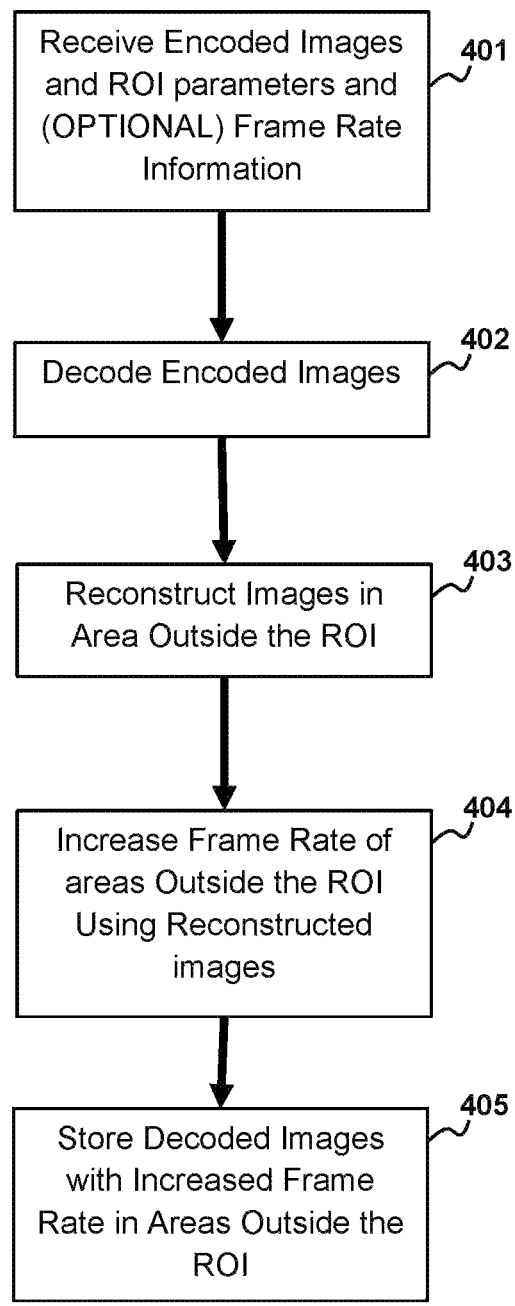
FIG. 4A depicts a method for decoding encoded temporally down sampled frames having down sampled frame rate information according to aspects of the present disclosure.

FIG. 4A depicts a method for decoding encoded temporally down sampled frames having down sampled frame rate information. Initially the device may receive encoded image frames transmitted over a network, from another device, or from another portion of the device, as indicated at 401.

The encoded temporally down sampled images, may be decoded according to methods discussed in a later section or according to whatever method the image frames, were encoded, as indicated at 402.

During decoding, temporal up sampling may be applied to frames within the temporal down sampling interval, as indicated at 403. Frame rate temporal up sampling may be applied to frames that have duplicated pixel information from previous frames or are lacking color or other image information due to temporal down sampling to generate images for the temporally down sampled frames. By way of example and not by way limitation, one method of temporal up sampling is to interpolate the areas outside the ROI of the beginning frame in the temporal downscaling interval with the areas outside the ROI of the ending frame in the temporal downscaling interval. Unlike the above-described embodiment with regards to motion information, in the current embodiment image information such as color information or chroma and luma information of the one or more areas are interpolated. As discussed above interpolation methods may be any known in the art for example and without limitation, optical flow, linear interpolation, polynomial interpolation or spline interpolation. This interpolation can be considered a reconstruction of the images in the one or more areas outside the ROI or a composite image created in the one or more areas outside the ROI created by interpolation. In some implementations, interpolation may be replaced with simply repeating the previous frame to save computation cycles.

Optical flow is a per pixel prediction that estimates how a pixel's brightness moves across the screen over time. Optical flow assumes that a pixel characteristic at a given time t (e.g., chroma or luma values) is the same at a later time $t+\Delta t$ but at a different location, where the change in location is predicted by a flow field. Optical flow is a more accurate but slower process to perform interpolation. Optical flow is described in detail in "What is Optical Flow and why does it matter in deep learning", by Mark Gituma, which is incorporated herein by reference and a copy of which may be accessed at the following URL:

https://medium.com/swlh/what-is-optical-flow-and-why-does-it-matter-in-deep-learning-b3278bb205b5.

The interpolation of the beginning and ending images of the temporal down sampling interval may be used to create a number of composite images. These composite images are combined with the non-composite images in the ROI, which retained their information during encoding, as indicated at 404. Reconstructing the one or more areas outside the ROI of the frames in the temporal down sampling interval effectively increases the frame rate of that image area, as more chroma and luma information is available for the display in the reconstructed areas.

Once a frame in the temporal down sampling interval has been regenerated, it can be stored in storage for later use 405. Alternatively, the regenerated frames can be stored in a display buffer to be displayed on a display device or sent to a display device. In another implementation, the regenerated frame may be stored and sent to remote display device such as television.

Figure 4B:
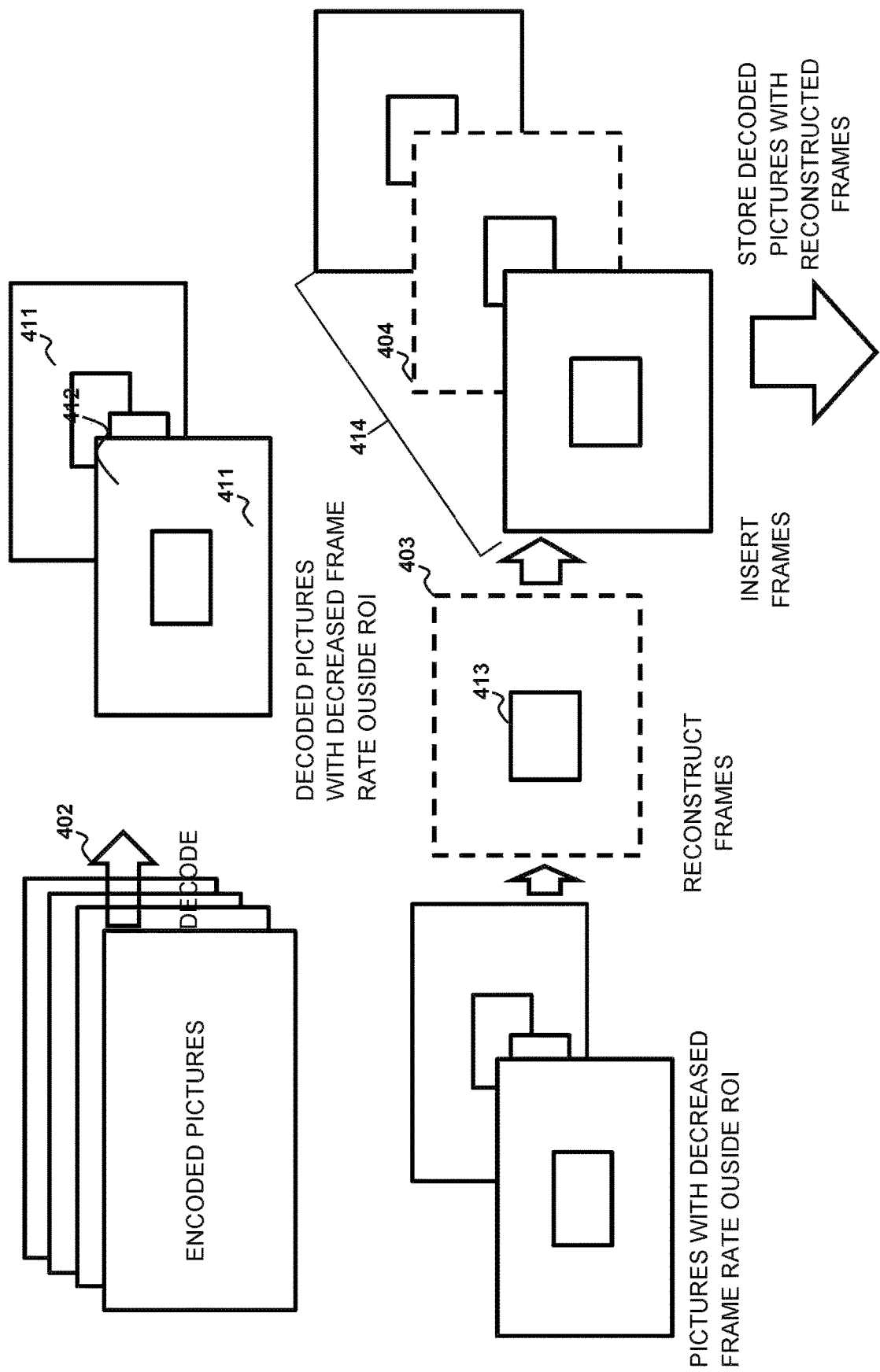
FIG. 4B graphically depicts the method of decoding encoded imaged frames that are frame rate temporally down sampled.

FIG. 4B graphically depicts the method of decoding encoded image frames that are frame rate temporally down sampled. During decoding images with chroma and luma information outside the ROI 411 as well as images with only chroma and luma information in the ROI 412 are decoded. Chroma and luma information is reconstructed at 403 using interpolation as described above for the pictures missing chroma and luma information in areas outsider the ROI 412. ROI parameters are used to guide placement of the ROI 413 within the generated image. The reconstructed images are then inserted in their proper location in the image stream using the temporal down sampling interval information 414.

Figure 4C:
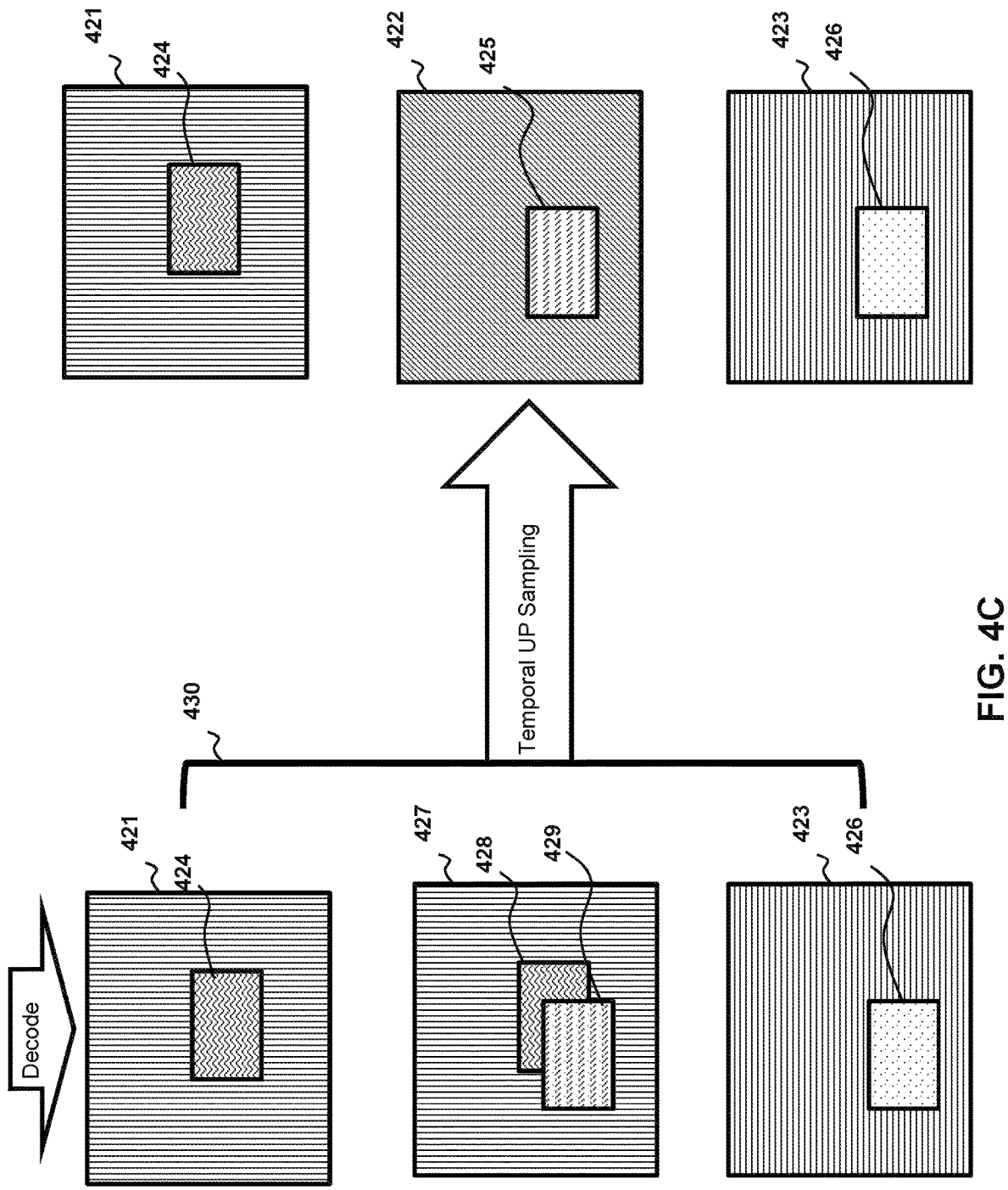
FIG. 4C graphically shows another implementation of decoding image frames that are frame rate temporally down sampled and that include information from a previous frame outside the ROI in the intermediate frames according to aspects of the present disclosure.

FIG. 4C shows a method for decoding image frames that are frame rate temporally down sampled and that include information from a previous frame outside the ROI in the intermediate frames. The temporally down sampled pictures may initially be encoded in a known encoding method such without limitation, AVC/H.264, HEVC/H.265 etc. as generally described in a later section. The decoded image frames may comprise an initial image frame 421 an intermediate image 427 and a final image frame 423. Image frames may contain ROIs that move during the course of the presentation. As shown the previous frame has ROI 424, the intermediate frame has ROI 429 and the final frame has ROI

426. The intermediate frame was temporally down sampled during the encoding process and in this implementation has chroma and luma values outside the ROI duplicated from the area outside the ROI of the previous frame. Additionally because the location of the ROI 429 of the intermediate frame 427 moved, chroma and luma information from the ROI 424 of the initial frame 421 is used to fill areas outside the ROI 428 of the intermediate frame.

Chroma and luma information for areas outside the ROI may be reconstructed during decoding through temporal up sampling. Temporal up sampling may interpolate chroma and luma values for areas outside the ROI 425 in the intermediate frame 422 over the temporal down sampling interval 430. In the shown example, chroma and luma values for areas outside the ROI of the initial frame 421 and the final frame 423 are interpolated to create chroma and luma values for areas outside the ROI 425 of the intermediate frame 422. Because the ROI moves during from the previous frame 421 to the final frame 426 chroma and luma values in the ROI of the previous frame 424 and final frame 426 may be used during the interpolation to reconstruct areas outside the ROI in the intermediate frame. Regions that were part of the ROI in a previous frame and used during interpolation are not spatially up sampled in the intermediate frame in order to maintain the correct frame size. Information about the location of the ROIs and the temporal down sampling interval may be stored in metadata for the image frames or as separately transmitted data.

Figure 4D:
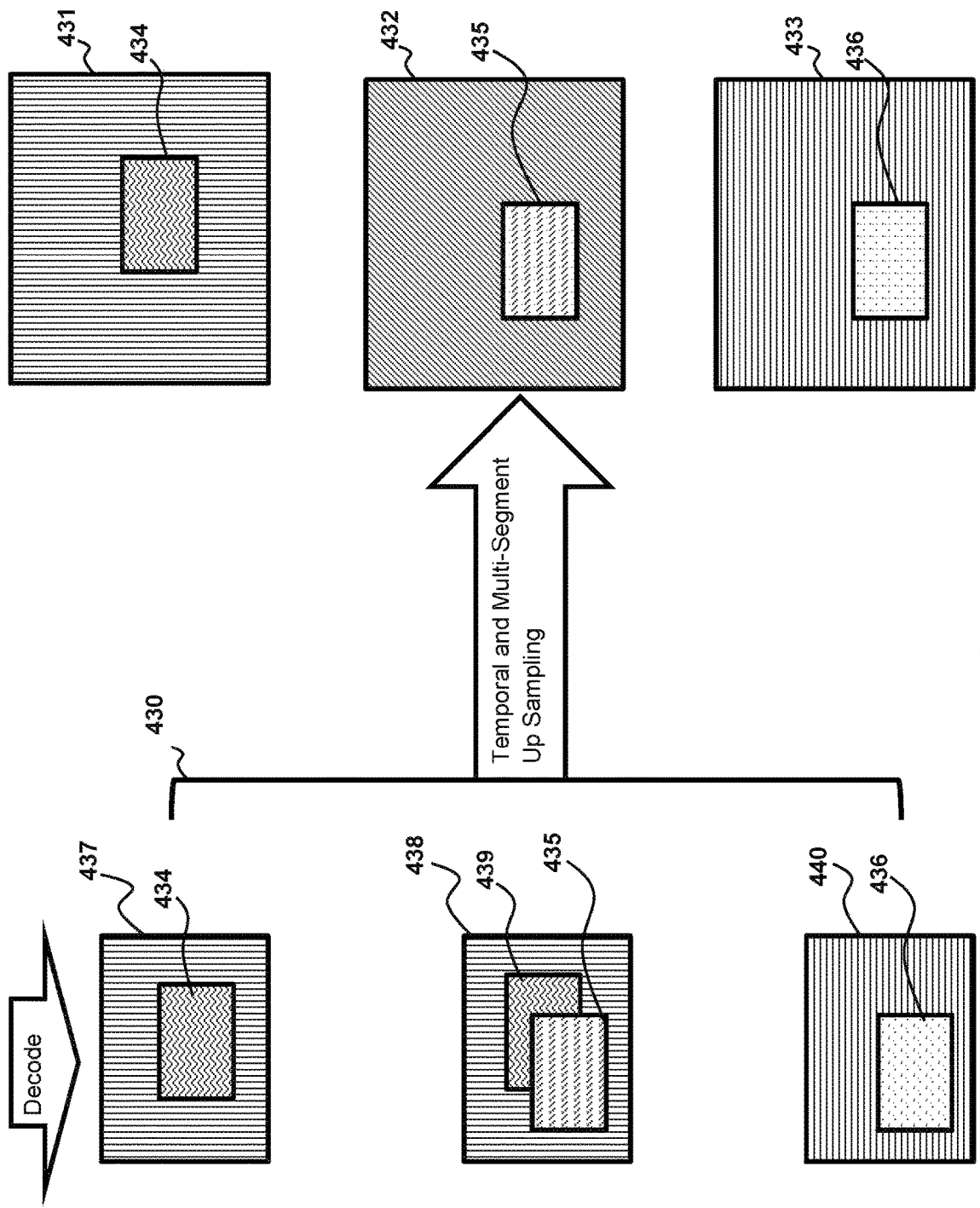
FIG. 4D shows another implementation of decoding image frames that are frame rate temporally down sampled and multi-segment spatially down sampled frames according to aspects of the present disclosure.

FIG. 4D shows a method for decoding image frames that are frame rate temporally down sampled and multi-segment spatially down sampled frames. The temporally and spatially down sampled pictures may initially be encoded in a known encoding method such without limitation, AVC/H.264, HEVC/H.265 etc. as generally described in a later section. The decoded image frames may comprise spatially down sampled, initial image frame 437, intermediate image 438 and final image frame 440. As shown the decoded image frames are smaller than the source image frames due to multi-segment spatial down sampling. Image frames may contain ROIs that move during the course of the presentation. As shown the previous frame has ROI 434, the intermediate frame has ROI 435 and the final frame has ROI 436. The intermediate frame was temporally down sampled during the encoding process and in this implementation has chroma and luma values outside the ROI duplicated from the area outside the ROI of the previous frame. Additionally because the location of the ROI 435 of the intermediate frame 438 moved, chroma and luma information from the ROI 434 of the initial frame 437 is used to fill areas outside the ROI 439 of the intermediate frame.

Chroma and luma information for areas outside the ROI may be reconstructed during decoding through temporal up sampling and multi-segment spatial up-sampling. Spatial up-sampling may use the location of the ROI in each image frame and interpolate between pixels neighboring in areas outside the ROI to generate an up sampled image frame. In some implementation the ROI may not undergo interpolation during spatial up sampling as its size and location is fixed by the ROI parameters. Temporal up sampling may interpolate chroma and luma values for areas outside the ROI 435 in the intermediate frame 432 over the temporal down sampling interval 430. In the shown example, chroma and luma values for areas outside the ROI of the initial frame 431 and the final frame 433 are interpolated to create chroma and luma values for areas outside the ROI 435 of the intermediate frame 432. Because the ROI moves during from the previous frame 431 to the final frame 436 chroma and luma values in the ROI of the previous frame 434 and final frame 426 may be used during the interpolation to reconstruct areas outside the ROI in the intermediate frame. Information about the location of the ROIs and the temporal down sampling interval may be stored in metadata for the image frames or as separately transmitted data. According to aspects of the present disclosure, interpolation may be used to generate missing information in frames that occur during the temporal down sampling interval. There are numerous different interpolation techniques known including, linear interpolation, polynomial interpolation and spline interpolation. In general, interpolation generates an equation for a curve or a line that fits a connection between two or more data points and allows generation of other data points using the curve.

Figure 5A:
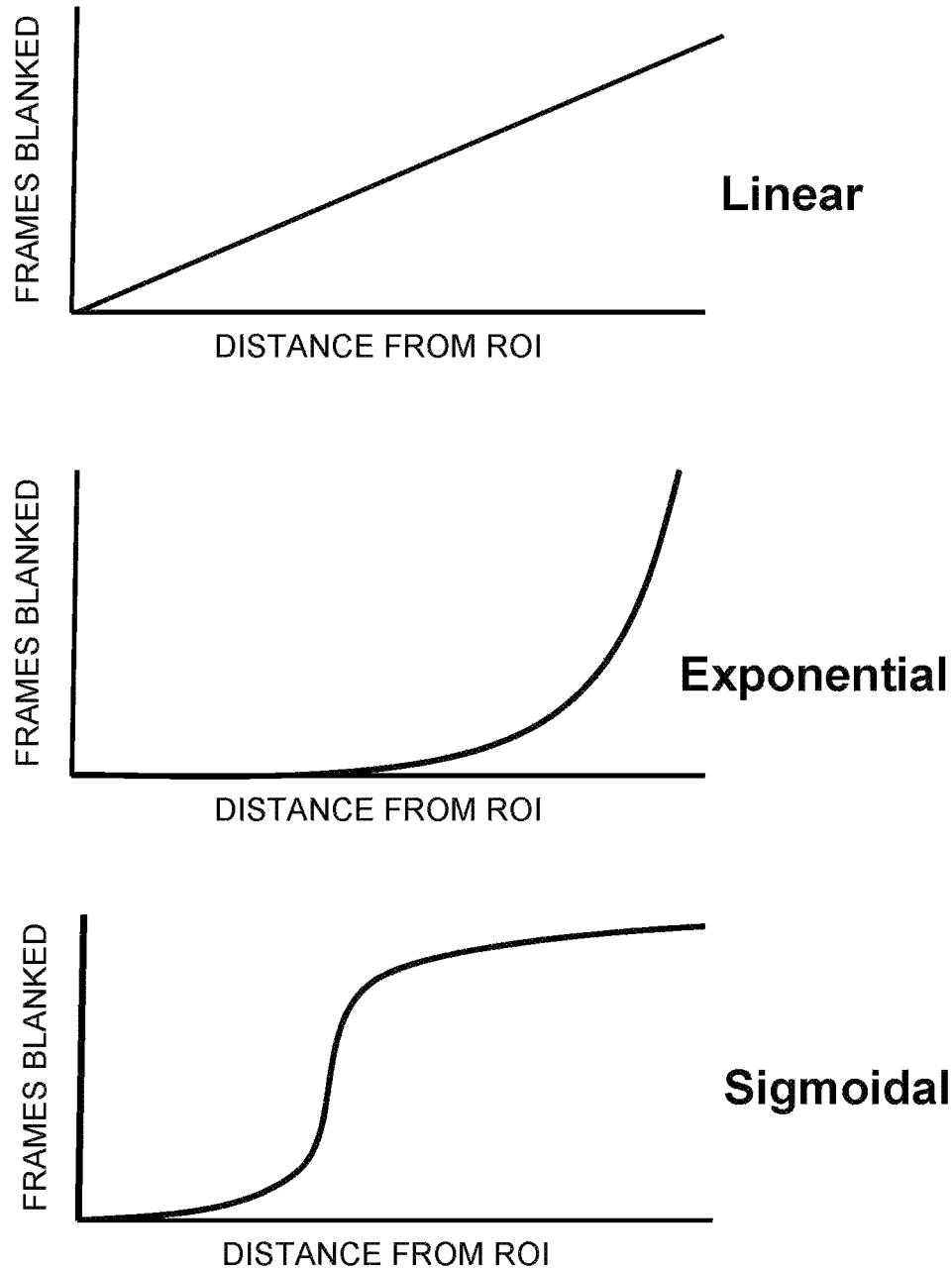
FIG. 5A shows graphs illustrating examples of how the temporal down sampling interval changes as a matter of frames having information blanked as a function of distance from the region of interest during according to aspects of the present disclosure.

According to additional aspects of the present disclosure, temporal down sampling interval might not be fixed throughout an image frame. The temporal down sampling interval may vary depending on location within the image frame. For example and without limitation the temporal down sampling interval may be smaller closer to the ROI and large further from the ROI within the frame as shown in FIG. 5A. FIG. 5A shows graphs describing how the temporal down sampling interval changes as a matter of frames having information blanked vs distance from the region of interest during according to aspects of the present disclosure. Shown in the linear case areas closer to the ROI have less frames with information removed than areas farther away from the ROI. Additionally the change in the temporal down sampling interval as the distance increases from the ROI may be for example and without limitation, linear, exponential or sigmoidal as shown in FIG. 5A.

Low Pass Filtering during a Saccade

According to aspects of the present disclosure transmission bandwidth may be further decreased by filtering images during a saccade. When a user blinks, the eyelids shut off visual information in the form of light to the user's eyes. Human eyes also exhibit rapid eye movements known as saccades. A phenomenon known as saccadic masking occurs during a saccade. Saccadic masking causes the brain to suppress visual information during eye movements. There is a relatively large variation in the duration of a saccade or blink. For example, a saccade typically lasts from 20 to 200 ms. This corresponds to between 2 and 25 frames at a frame rate of 120 frames per second (fps). Even if it takes 10 ms to detect the start of saccade and the saccade only lasts 20 ms, the graphics system can save one frame, e.g., not render to reduce computation or turn off the display to save power or both. A blink typically lasts from about 100 ms to about 150 ms, which is sufficient time for 12 to 18 frames at 120 fps.

Figure 5B:
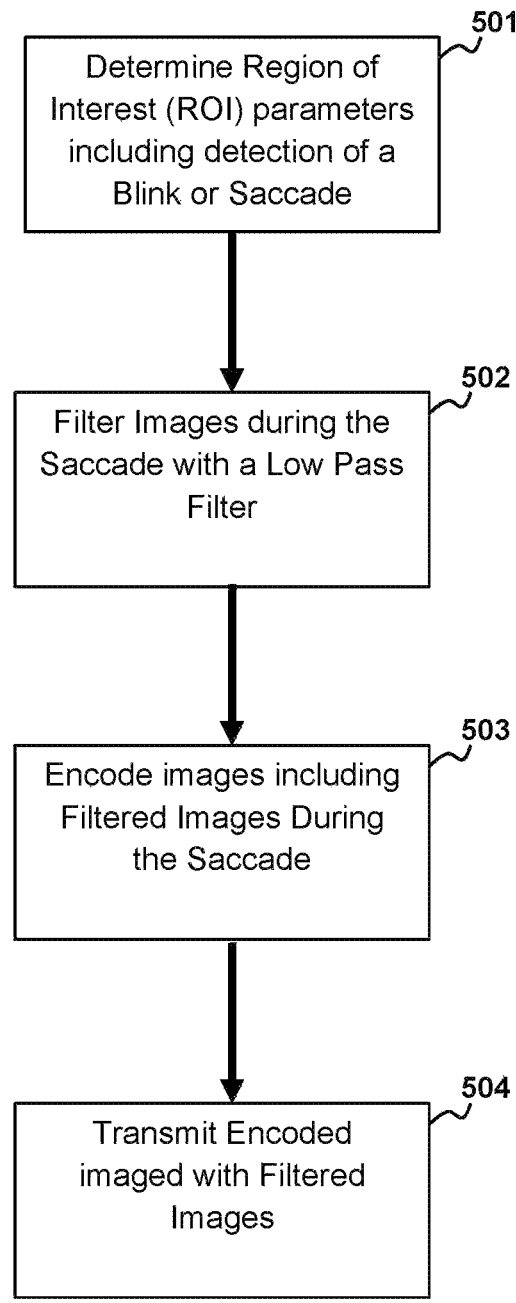
FIG. 5B depicts a method for further reducing encoded data size using gaze tracking according to aspects of the present disclosure.

FIG. 5B depicts a method for further reducing encoded data size using gaze tracking according to aspects of the present disclosure. The determination of ROI parameters may include detection or prediction of a blink or saccade 501. Gaze tracking information or image information used to determine ROI parameters may be analyzed to detect the onset of a saccade or blink and predict its duration. For example, the onset of a saccade may be correlated to rotational velocity and or acceleration of the eye. The onset of a blink may be correlated to movement of the eyelids as determined from analysis of images or electrophysiological information collected by sensors. By way of example, and not by way of limitation, the duration of a saccade can be estimated from measured rotational velocity of the eye obtained from gaze tracking and a known correlation between rotational velocity and saccade duration. For example, the duration of saccadic masking tends to increase with increasing rotational velocity of the eye at the onset of a saccade. For more information regarding detection of blinks and saccades as well as processing manipulation, see U.S. Pat. No. 10,372,205 to Young et al.

In response to a blink or saccade, the device may apply a low pass filter to images including the ROI during encoding, as indicated at 502. The device may synchronize application of the low pass filter with the saccade so that image frames that occur during the saccade have a low pass filter applied to them while image frames not occurring during the saccade do not have a low pass filter applied to them. Application of the low pass filter to an image frame reduces the amount of bits required to encode image frame. The cut off and attenuation of the low pass filter may be chosen to reduce the bit count of the encoded image. After a low pass filter is applied to image frames that are determined to occur synchronously with a saccade of the user, the image frames are completely encoded, as indicated at 503.

After encoding, the resulting encoded image data may be transmitted 504, for example and without limitation over a network to a client device or from a cache to memory or through a personal area network to another device. The above-described aspects may be applied in conjunction with the temporal down sampling to decrease encoded image sizes.

Encoding

Figure 6A:
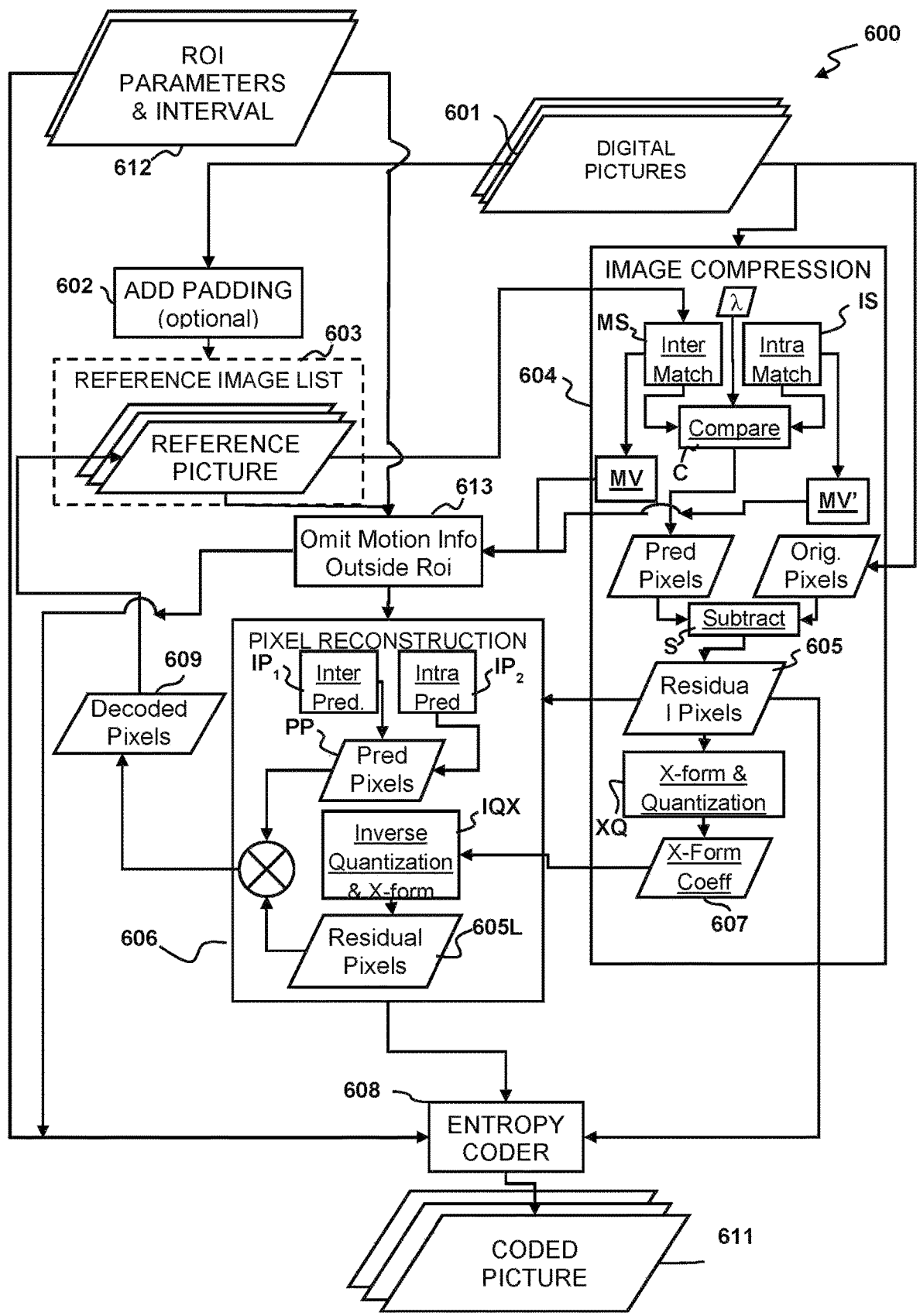
FIG. 6A depicts a motion information temporal down sampling process according to aspects of the present disclosure.

The motion vector temporal down sampling encoding process as shown in FIG. 6A, initially begins with unencoded image frame data 601, which may be generated by the system or received from some other source. The system resolves the ROI parameters 612 using predictive algorithms, gaze tracking apparatus or other such methods or devices. The ROI parameters 612 are used with the set of digital pictures 601 to perform the motion vector temporal down sampling at 613. The ROI parameters are preserved and encoded, as indicated at 608 or otherwise included with the coded picture data 611. It should be understood that each frame or picture in the set of digital pictures may have its own ROI parameters and that the ROI parameters may change from frame to frame or picture to picture. Likewise, in some embodiments the set of digital pictures may without limitation be still image.

The unencoded digital picture data 601 may be encoded by normal means. By way of example, and not by way of limitation, digital data may be encoded according to a generalized method 600. An encoder receives data corresponding to a plurality of digital images 601 and encodes the data for each image. Encoding of the digital picture data 601 may proceed on a section-by-section basis. The encoding process for each section may optionally involve padding 602, image compression 604 and pixel reconstruction 606. To facilitate a common process flow for both intra-coded and inter-coded pictures, all un-decoded pixels within a currently processing picture 601 may be padded with temporary pixel values to produce a padded picture, as indicated at 602. The padding may proceed, e.g., as described above in U.S. Pat. No. 8,711,933, which is incorporated herein by reference. The padded picture may be added to a list of reference pictures 603 stored in a buffer. Padding the picture at 602 facilitates the use of a currently-processing picture as a reference picture in subsequent processing during image compression 604 and pixel reconstruction 606. Such padding is described in detail in commonly-assigned U.S. Pat. No. 8,218,641, which is incorporated herein by reference.

As used herein, image compression refers to the application of data compression to digital images. The objective of the image compression 604 is to reduce redundancy of the image data for a give image 601 in order to be able to store or transmit the data for that image in an efficient form of compressed data. The image compression 604 may be lossy or lossless. Lossless compression is sometimes preferred for artificial images such as technical drawings, icons or comics. This is because lossy compression methods, especially when used at low bit rates, introduce compression artifacts. Lossless compression methods may also be preferred for high value content, such as medical imagery or image scans made for archival purposes. Lossy methods are especially suitable for natural images such as photos in applications where minor (sometimes imperceptible) loss of fidelity is acceptable to achieve a substantial reduction in bit rate.

Examples of methods for lossless image compression include, but are not limited to Run-length encoding—used as default method in PCX and as one of possible in BMP, TGA, TIFF, Entropy coding, adaptive dictionary algorithms such as LZW—used in GIF and TIFF and deflation—used in PNG, MNG and TIFF. Examples of methods for lossy compression include reducing the color space of a picture 604 to the most common colors in the image, Chroma subsampling, transform coding, and fractal compression.

In color space reduction, the selected colors may be specified in the color palette in the header of the compressed image. Each pixel just references the index of a color in the color palette. This method can be combined with dithering to avoid posterization. Chroma subsampling takes advantage of the fact that the eye perceives brightness more sharply than color, by dropping half or more of the chrominance information in the image. Transform coding is perhaps the most commonly used image compression method. Transform coding typically applies a Fourier-related transform such as a discrete cosine transform (DCT) or the wavelet transform, followed by quantization and entropy coding. Fractal compression relies on the fact that in certain images, parts of the image resemble other parts of the same image. Fractal algorithms convert these parts, or more precisely, geometric shapes into mathematical data called "fractal codes" which are used to recreate the encoded image.

The image compression at 604 may include region of interest coding in which certain parts of an image 601 are encoded with higher quality than others. This can be combined with scalability, which involves encoding certain parts of an image first and others later. Compressed data can contain information about the image (sometimes referred to as meta information or metadata) which can be used to categorize, search or browse images. Such information can include color and texture statistics, small preview images and author/copyright information.

By way of example, and not by way of limitation, during image compression at 604 the encoder may search for the best way to compress a block of pixels. The encoder can search all of the reference pictures in the reference picture list 603, including the currently padded picture, for a good match. If the current picture (or subsection) is coded as an intra picture, (or subsection) only the padded picture is available in the reference list. The image compression at 604 produces a motion vector MV and transform coefficients 607 that are subsequently used along with one or more of the reference pictures (including the padded picture) during pixel reconstruction at 606.

The image compression 604 generally includes a motion search MS for a best inter prediction match, an intra search IS for a best intra prediction match, an inter/intra comparison C to decide whether the current macroblock is inter-coded or intra-coded, a subtraction S of the original input pixels from the section being encoded with best match predicted pixels to calculate lossless residual pixels 605. The residual pixels then undergo a transform and quantization XQ to produce transform coefficients 607. The transform is typically based on a Fourier transform, such as a discrete cosine transform (DCT).

The transform outputs a set of coefficients, each of which is a weighting value for a standard basis pattern. When combined, the weighted basis patterns re-create the block of residual samples. The output of the transform, a block of transform coefficients, is quantized, i.e. each coefficient is divided by an integer value. Quantization reduces the precision of the transform coefficients according to a quantization parameter (QP). Typically, the result is a block in which most or all of the coefficients are zero, with a few non-zero coefficients. Setting QP to a high value means that more coefficients are set to zero, resulting in high compression at the expense of poor decoded image quality. For a low QP value, more non-zero coefficients remain after quantization, resulting in better decoded image quality but lower compression. Conversely, for a high QP value, fewer non-zero coefficients remain after quantization, resulting in higher image compression but lower image quality.

The inter/intra comparison C, also referred to as a mode decision uses a parameter known as a Lagrange multiplier $\lambda$ that is related to QP. A cost function J is computed using a value of $\lambda$ determined from the value of QP. The encoding mode is determined based on whether the computed cost function J for inter mode coding is above or below a computed cost for intra mode coding. By way of example, the H.264/AVC codec supports a cost function $J_H$, which should be minimized by computing the actual bit consumption R for encoding the overhead (e.g., motion vectors, types) of the section and the reconstruction distortion D (measured, e.g., as a sum of absolute differences, SAD between the original and reconstructed sections). In such a case, the cost function $J_H$ is computed according to $$J_H = D + \lambda \cdot R$$

In alternative implementations, the distortion D may be calculated differently. There are many ways to represent the distortion, for example, sum of squared differences (SSD), sum of absolute transformed differences (SATD), mean absolute difference (MAD), and the like. Those skilled in the art will recognize that for different distortion measures, the cost function has to be modified or re-tuned accordingly.

Under some circumstances, an improper encoding mode decision can trigger an unnecessary IDR or I-frame insertion. Consider an example of steaming video during online video gaming. The encoder tries to meet a target bit rate for the video stream that is generated by a game application. The target bit rate is related to the number of bits per frame. If the game is paused, the video is essentially a stream of still frames. For a still frame, the QP is low in order to meet the target bits for the frame in rate distortion optimization process. When QP is low, the mode decision selects intra coding for most sections (e.g., macroblocks) in a still frame. If the number of intra-coded sections in a frame is above a threshold, the codec triggers a scene-change detection and the next frame is coded as an intra frame with extremely low QP, which requires a large number of bits to encode. This is due to the fact that extremely low values of QP (e.g., QP=1, 2) implies nearly lossless coding in this case. By way of example, and not by way of limitation, the threshold for triggering scene change detection may be about 60-80% intra MB in a frame. A sequence of still frames causes in a sequence of scene change detections even though the same frame is being repeated. The sequence of intra-frames can cause large and frequent spikes of bit rate usage in a bandwidth-limited communication channel.

Normally relationship between A and QP is fixed by the codec and is the same for all pictures. According to aspects of the present disclosure, the relationship between A and QP can be adjusted from picture to picture depending on the number of bits per section in a picture.

According to aspects of the present disclosure, the relation between A and QP can be adapted based on the number of bits per section so that the encoding mode decision can be configured in a way that reduces the likelihood of unnecessary IDR or I-frame insertion.

According to aspects of the present disclosure, the relationship between $\lambda$ and QP may be selectively adjusted during encoding. E.g., at the beginning of encoding of a video stream or the beginning of each video frame in a stream in a way that makes it more likely for the section encoding mode decision to result in an "inter" coding decision instead of an "intra" coding mode.

In some implementations it is even possible to change the $\lambda$ versus QP relationship for each section if there are different size sections in a frame, e.g., as is possible in H.265. This could be beneficial, e.g., in two-pass encoding use cases since the first pass would provide more insight about the content of the picture sections so that better coding mode decisions can be made.

By way of example, and not by way of limitation, adjustment to the relationship between $\lambda$ and QP may depend on the number of bits in a section (NBS), which generally depends on the target bitrate (e.g., in bits per second), the frame rate (e.g., in frames per second), and the number of sections in a frame. The number of bits in a section NBS can be calculated by dividing the target bitrate BR by the product of the frame rate FR and the number of sections per frame (NSF). By way of example, and not by way of limitation, this can be expressed as:

$$NBS = BR/(FR \cdot NSF)$$

More generally, the number of bits per section (NBS) may be more broadly expressed as $$NBS = (BPF)/(NSF), \text{ where } BPF \text{ is the target number of bits per frame.}$$

This broadened expression allows for the possibility that the value of NBS could be different from frame to frame, depending, e.g., on the target bits allocated by the underlying rate control scheme. In the case of a fixed target number of bits for each frame BPF becomes BR/FR.

The number of sections (e.g., MB) per frame depends on the resolution. The change to the table can be triggered by a combination of resolution, frame rate, and bit rate. E.g., a table change would be triggered for a frame having 960 by 540 resolution, a frame rate of 30 fps, and a target rate of 8-10 Mbps or higher. For a given bitrate and frame rate a table change is less likely to be triggered if the resolution increases. For a given bitrate and resolution a table change is less likely to be triggered if the frame rate increases. For a given frame rate and resolution a table change is less likely to be triggered if the bitrate decreases.

The relationship between A and QP is typically nonlinear. Generally, when QP is high A is high and when QP is low A is low. Examples of relationships between A and QP are described in U.S. Pat. No. 9,386,317 the entire contents of which are been incorporated herein by reference.

The QP value can be adjusted depending on the target bitrate. Since QP controls bit usage in encoding, many encoding programs utilize a rate controller that adjusts QP in order to achieve a desired bitrate. The encoder receives uncompressed source data (e.g., an input video) and produces compressed output. The video coding method typically uses a QP value that affects the bit usage for encoding a video section and therefore affects the bitrate. Generally, lower QP results in a higher bitrate. A rate controller determines a QP value based on a demanded bitrate, which may be specified by an external application. The encoder uses the QP value determined by the rate controller and determines the actual resulting bit usage and bit rate. The rate controller can use the actual bit rate to adjust the QP value in a feedback loop.

A relationship between the bitrate and the value of the QP depends partly on the complexity of the image being. The bitrate versus QP relationship can be expressed in terms of a set of curves with different curves for different levels of complexity. The heart of the algorithm implemented by the rate controller is a quantitative model describing a relationship between QP, actual bitrate and some measure of complexity. The relevant bitrate and complexity are generally associated only with the differences between source pixels and predicted pixels (often referred to as residuals) because the quantization parameter QP can only influence the detail of information carried in the transformed residuals.

Complexity generally refers to amount of spatial variation within a picture or part of the picture. On a local level, e.g., block or macroblock level, the spatial variation may be measured by the variance of the pixel values within the relevant section. However, for a video sequence, complexity may also relate to the temporal variation of a scene of a sequence of images. For example, a video sequence consists of one object having substantial spatial variation that translates slowly across the field of view, may not require very many bits because temporal prediction can easily capture the motion using a single reference picture and a series of motion vectors. Although it is difficult to define an inclusive video complexity metric that is also easy to calculate, the Mean Average Difference (MAD) of the prediction error (difference between source pixel value and predicted pixel value) is often used for this purpose.

It is noted that the quantization parameter QP may be determined from multiple factors including, but not limited to the picture type of the source picture, a complexity of the source picture, an estimated target number of bits and an underlying rate distortion model. For example, QP may be determined on a section-by-section basis using a variation for a section of the currently encoding picture, e.g., a section (e.g., MB) variance. Alternatively, QP for a currently encoding section may be determined using an actual bit count for encoding a co-located section (e.g., MB) in a previous frame. Examples of such QP level calculations are described, e.g., in commonly assigned U.S. Patent Application Publication No. 2011/0051806, now U.S. Pat. No. 8,879,623 to Hung-Ju Lee, which is incorporated herein by reference.

Motion search and prediction depend on the type of picture being encoded. Referring again to FIG. 6, if an intra picture is to be coded, the motion search MS and inter/intra comparison C are turned off. However, in embodiments of the present invention, since the padded picture is available as a reference, these functions are not turned off. Consequently, the image compression at 604 is the same for intra-coded pictures and inter-coded pictures.

The motion search MS may generate a motion vector MV by searching the picture 601 for a best matching block or macroblock for motion compensation as is normally done as part of pixel reconstruction for an inter-coded picture. If the current picture 601 is an intra-coded picture, by contrast, existing codecs typically do not allow prediction across pictures. Instead, all motion compensation is normally turned off for an intra picture (e.g., I-frame) and the picture coded by generating transform coefficients and performing pixel prediction. In some implementations, however, an intra picture may be used to do inter prediction by matching a section in the current picture to another offset section within that same picture. The offset between the two sections may be coded as a motion vector MV' that can be used that for pixel reconstruction at 606. By way of example, the encoder may attempt to match a block or macroblock in an intra picture with some other offset section in the same picture then code the offset between the two as a motion vector. The codec's ordinary motion vector compensation for an "inter" picture may then be used to do motion vector compensation on an "intra" picture. Certain existing codecs have functions that can convert an offset between two blocks or macroblocks into a motion vector, which can be followed to do pixel reconstruction at 606. However, these functions are conventionally turned off for encoding of intra pictures. In embodiments of the present invention, the codec may be instructed not to turn off such "inter" picture functions for encoding of intra pictures.

According to aspects of the present disclosure motion information such as motion vector MV and MV' may be omitted from one or more areas outside the ROI 613 in each picture. ROI parameters 612 may be used to determine the location of the ROI within the image frame. It is desirable to synchronize an interval for generating intra pictures (the "intra interval") with the temporal down sampling interval if both intervals are constant. For example, the intra interval could be divisible by the down sample interval. If an intra picture is to be inserted as a result of a scene change detection, the intra interval might not be constant. In such a case, the intra picture decision could be made independent from the down sample interval.

Normally, the encoder only encodes the difference between a previously encoded motion vector and the current motion vector. Then, a decoder can use the differential motion vector and a previous motion vector to reconstruct the current motion vector. According to aspects of the present disclosure, if a frame is determined to be inside the temporal down sampling interval. differential motion vectors are simply not generated for regions outside the ROI. A previously encoded motion vector may instead be used to reconstruct a region outside the ROI. Additionally the corresponding reference pictures may have the corresponding one or more areas outside the ROI blanked by replacement with a null value. Thus reducing the amount of information to be reconstructed 606. Additionally a temporal down sampling interval 612 may be used to determine which pictures have motion information omitted. In alternative embodiments instead of blanking motion vectors after calculation 613, Motion vectors for one or more areas outside the ROI are simply not generated during motion compression 606, the reference pictures in this alternative embodiment, have one or more areas outside the ROI blanked at 613 before being sent to pixel reconstruction. If the encoder determines to leave the areas outside the ROI blank, both motion vectors and DCT coefficients will not be generated.

The temporal down sampling interval according to aspects of the present disclosure begins and ends in frames that maintain motion vector information. The motion vector temporal down sampling interval may dictate the amount of frames motion vector information is blanked from or omitted from calculation. The temporal down sampling interval may be available for each section of the picture. For example and without limitation each macroblock, block or sub-block of the picture may have a temporal down sampling interval. The temporal down sampling interval may also be modified during encoding to account for Intra-predicted pictures, which do not have motion information. In some embodiments temporal down sampling interval may also specify frames that retain their motion information such as areas outside the ROI that have a motion vector of large magnitude. Areas with motion vectors of large magnitude may be detected during the omission of the motion vectors 613 and the entry in the temporal down sampling interval 612 for that area having a motion vector of large magnitude may be edited to accommodate the additional information during decoding. As noted above, the down sample interval for a region could depend on its distance relative to the ROI.

According to aspects of the present disclosure, residuals that that assist in temporal up sampling (interpolation) may be generated as part of pixel reconstruction. As used herein, pixel reconstruction refers to a technique for describing a picture in terms of the transformation of a reference image to a currently processing image. In general, the pixel reconstruction 606 acts as a local decoder within the encoder implementing the encoding process 600. Specifically, the pixel reconstruction 606 includes inter prediction IP1 and (optionally) intra prediction IP2 to get predicted pixels PP using the motion vector MV or MV' from the image compression 604 and reference pixels from a picture in the reference list. Inverse quantization and inverse transformation IQX using the transform coefficients 607 from the image compression 604 produce lossy residual pixels 605L which are added to the predicted pixels PP to generate decoded pixels 609. The decoded pixels 609 are inserted into the reference picture and are available for use in image compression 604 and pixel reconstruction 606 for a subsequent section of the currently-processing picture 601. After the decoded pixels have been inserted, un-decoded pixels in the reference picture may undergo padding 602. For in loop down/up sampling, the encoder local decoder may calculate the temporal up sampling result. The encoder then takes the difference between the original input picture pixel and the corresponding up sampling pixel as the residual pixel. Because the quality of the area outside the ROI could be lower, these residual pixels could be encoded with larger quantization parameters (QPs.)

In some encoder implementations, if the current picture is intra coded, the inter-prediction portions of pixel reconstruction 606 are turned off because there are no other pictures that can be used for pixel reconstruction. Alternatively, pixel reconstruction may be performed on any picture 601 independent of whether a particular picture is to be inter-coded or intra-coded. In some implementations, the encoder implementing may be modified to add the padded picture to the reference picture list 603 and the inter-prediction portions of the pixel reconstruction 606 are not turned off, even if the currently processing image is to be intra coded. As a result, the process flow for both inter coded sections and intra coded sections is the same during pixel reconstruction 606. The only major difference is the selection of the reference picture to be used for encoding. It is noted that in some implementations, motion-compensation need not be performed on all pictures, and padded pictures need not be added to the reference picture list.

By way of example, and not by way of limitation, in one type of pixel reconstruction, known as block pixel reconstruction (BMC), each image may be partitioned into blocks of pixels (e.g. macroblocks of 16×16 pixels). Each block is predicted from a block of equal size in the reference frame. The blocks are not transformed in any way apart from being shifted to the position of the predicted block. A motion vector MV represents this shift. To exploit the redundancy between neighboring block vectors, (e.g. for a single moving object covered by multiple blocks) it is common to encode only the difference between a current and previous motion vector in a bit-stream. The result of this differencing process is mathematically equivalent to global pixel reconstruction capable of panning. Further, down the encoding pipeline, the method 600 may optionally use entropy coding 608 to take advantage of the resulting statistical distribution of the motion vectors around the zero vector to reduce the output size. In some embodiments the ROI parameters and temporal down sampling interval 612 are included with the digital pictures 611 as part of the network wrapper in the Network Abstraction Layer (NAL). In other embodiments the ROI parameters and temporal down sampling interval 612 may be included in the digital pictures during entropy coding 608.

It is possible to shift a block by a non-integer number of pixels, which is called sub-pixel precision. The in-between pixels are generated by interpolating neighboring pixels. Commonly, half-pixel or quarter pixel precision is used. The computational expense of sub-pixel precision is much higher due to the extra processing required for interpolation and on the encoder side, a much greater number of potential source blocks to be evaluated.

Block pixel reconstruction divides a currently encoding image into non-overlapping blocks, and computes a pixel reconstruction vector that indicates where those blocks come from in a reference image. The reference blocks typically overlap in the source frame. Some video compression algorithms assemble the current image out of pieces of several different reference images in the reference image list 603.

The result of the image compression 604 and pixel reconstruction 606 and (optionally) entropy coding 608 is a set of data 611 referred to for convenience as a coded picture. The motion vector MV, (and/or intra prediction mode motion vector MV') and transform coefficients 607 may be included in the coded picture 611.

Figure 6B:
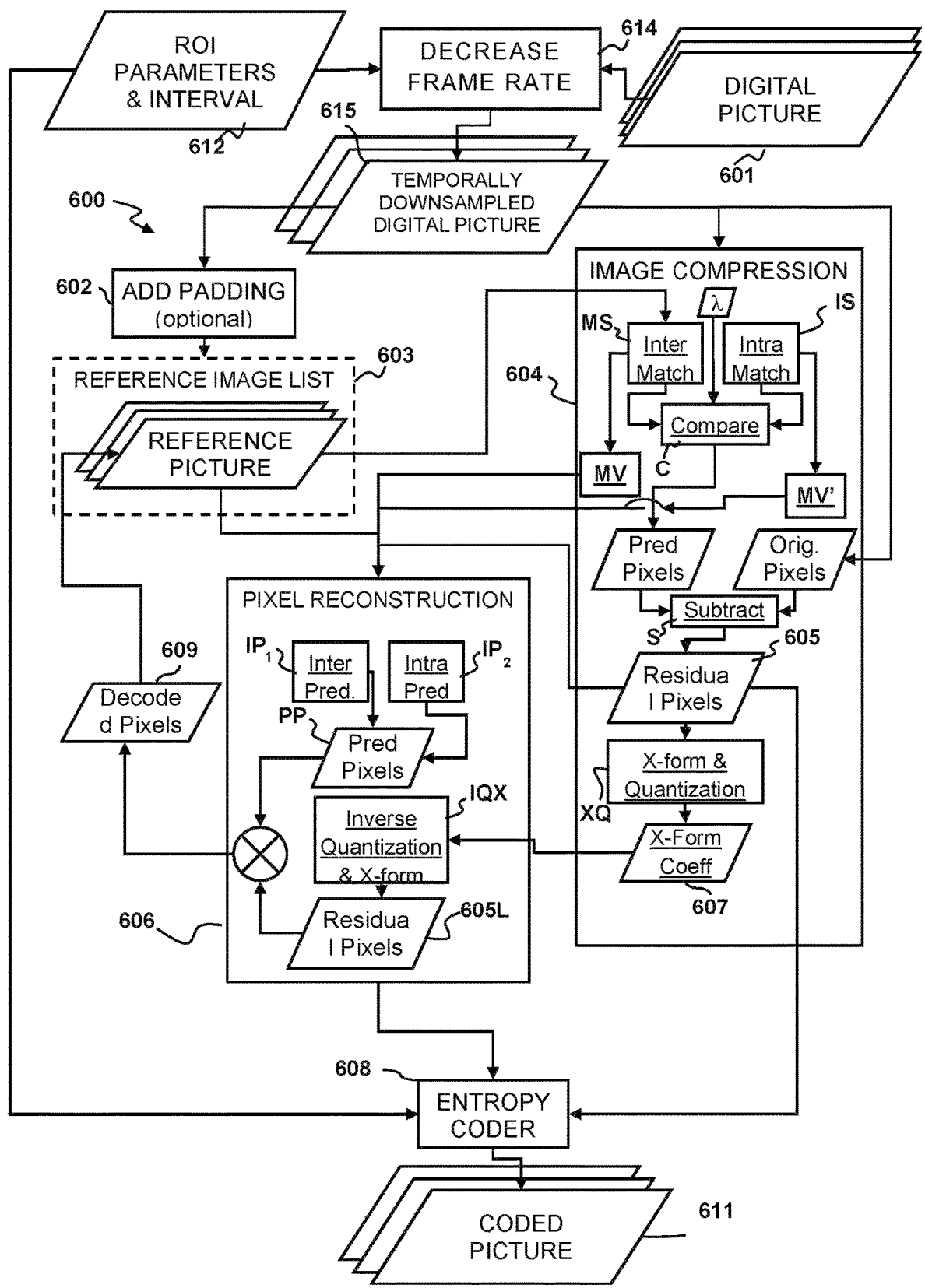
FIG. 6B shows a frame rate temporal down sampling process according to aspects of the present disclosure.

FIG. 6B depicts an alternate embodiment of the present disclosure implementing temporal down sampling using picture frame rates. The digital pictures 601 may have their frame rate down sampled 614 in one or more areas outside the ROI. ROI parameters 612 are used to determine the location shape and size of the ROI. The temporal down sampling interval is used to determine the frame rate of the areas outside the ROI. The frame rate down sampling 614 may be achieved by for example and without limitation replacing chroma and luma values in the one or more areas outside the ROI with null values.

In this example, the temporal down sampling interval may specify how many frames have areas with null values for chroma and luma. The temporal down sampling interval may be specified for areas of different sizes for example and without limitation the temporal down sampling interval may be on the scale of; line, macroblock, block or sub block. As discussed above the beginning and ending frames of the temporal down sampling interval may retain their information outside the ROI. Here, for the beginning and ending frames of the temporal down sampling interval chroma and luma information for areas outside the ROI are retained. After performing frame rate down sampling, the temporally down sampled frames 615 undergo other encoding operations including image compression at 604 and (optionally)

padding at 602 as discussed above. It should be noted that in these embodiments, motion vector temporal down sampling is not performed and therefore motion vectors for areas outside the ROI are not removed.

Decoding

Figure 7:
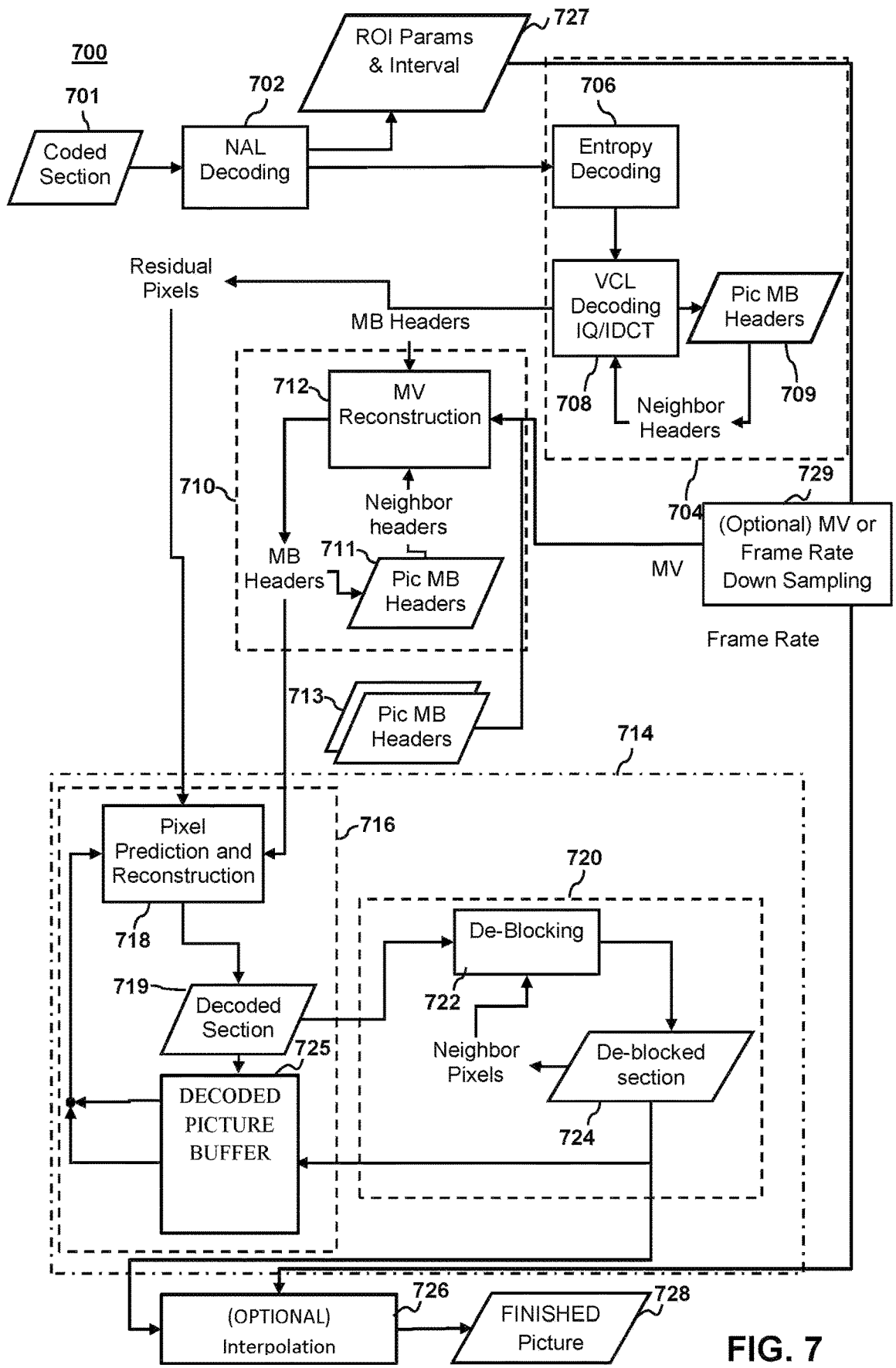
FIG. 7 illustrates an example method for decoding of temporally down-sampled streaming data with ROI parameters according to aspects of the present disclosure.

FIG. 7 illustrates an example of a possible process flow in a method 700 for decoding of temporally down-sampled streaming data 701 with ROI parameters that may be used in conjunction with aspects of the present disclosure. This particular example shows the process flow for video decoding, e.g., using the AVC (H.264) standard. The coded streaming data 701 may initially be stored in a buffer. Where coded streaming data 701 (e.g., a video data bit stream) has been transferred over a network, e.g., the Internet, the data 701 may initially undergo a process referred to as network abstraction layer (NAL) decoding, indicated at 702. The Network Abstraction Layer (NAL) is a part of streaming data standards, such as the H.264/AVC and HEVC video coding standards. The main goal of the NAL is the provision of a "network-friendly" representation of streaming data for "conversational" (e.g., video telephony) and "non-conversational" (storage, broadcast, or streaming) applications. NAL decoding may remove from the data 701 information added to assist in transmitting the data. Such information, referred to as a "network wrapper" may identify the data as video data or indicate a beginning or end of a bit stream, bits for alignment of data, and/or metadata about the video data itself.

In addition, by way of example, the network wrapper may include information about the data 701, including, e.g., resolution, picture display format, color palette transform matrix for displaying the data, information on the number of bits in each picture, slice or macroblock, as well as information used in lower level decoding, e.g., data indicating the beginning or ending of a slice. This information may be used to determine the number of macroblocks to pass to each of the task groups in a single section. Due to its complexity, NAL decoding is typically done on a picture and slice level. The smallest NAL buffer used for NAL decoding is usually slice sized. The example illustrated in FIG. 7 is described in terms of macroblocks and the AVC (H.264) standard. However, these are not limiting features of aspects of the present disclosure. For example, in the latest H.265 (HEVC) standard, there is no macroblock concept. Instead, more flexible Coding Unit (CU), Prediction Unit, (PU), Transform Unit (TU) concepts are introduced. Aspects of the present disclosure may operate in conjunction with such coding standards. By way of example, and not by way of limitation, the network wrapper may include ROI parameters and temporal down sampling intervals 727. Alternatively, the ROI parameters and temporal down sampling intervals may be received separately or may be unencoded. Additionally temporal down sampling intervals may be encoded in the headers of frames that make up a bitstream or in other frame metadata. Alternatively, the temporal down sampling intervals may be included as part of Supplemental Enhancement Information, which is extra information that can be inserted into the bitstream.

In some embodiments, after NAL decoding at 702, the remaining decoding illustrated in FIG. 7 may be implemented in three different thread groups or task groups referred to herein as video coding layer (VCL) decoding 704, motion vector (MV) reconstruction 710 and picture reconstruction 714. The picture reconstruction task group 714 may include pixel prediction and reconstruction 716 and post processing 720. In some embodiments of the present invention, these tasks groups may be chosen based on data dependencies such that each task group may complete its processing of all the macroblocks in a picture (e.g., frame or field) or section before the macroblocks are sent to the next task group for subsequent processing.

Certain coding standards may use a form of data compression that involves transformation of the pixel information from a spatial domain to a frequency domain. One such transform, among others, is known as a discrete cosine transform (DCT). The decoding process for such compressed data involves the inverse transformation from the frequency domain back to the spatial domain. In the case of data compressed using DCT, the inverse process is known as inverse discrete cosine transformation (IDCT). The transformed data is sometimes quantized to reduce the number of bits used to represent numbers in the discrete transformed data. For example, numbers 1, 2, 3 may all be mapped to 2 and numbers 4, 5, 6 may all be mapped to 5. To decompress the data a process known as inverse quantization (IQ) is used before performing the inverse transform from the frequency domain to the spatial domain. The data dependencies for the VCL IQ/IDCT decoding process 704 are typically at the macroblock level for macroblocks within the same slice. Consequently, results produced by the VCL decoding process 704 may be buffered at the macroblock level.

VCL decoding 704 often includes a process referred to as Entropy Decoding 706, which is used to decode the VCL syntax. Many codecs, such as AVC(H.264), use a layer of encoding referred to as entropy encoding. Entropy encoding is a coding scheme that assigns codes to signals so as to match code lengths with the probabilities of the signals. Typically, entropy encoders are used to compress data by replacing symbols represented by equal-length codes with symbols represented by codes proportional to the negative logarithm of the probability. AVC(H.264) supports two entropy encoding schemes, Context Adaptive Variable Length Coding (CAVLC) and Context Adaptive Binary Arithmetic Coding (CABAC). Since CABAC tends to offer about 10% more compression than CAVLC, CABAC is favored by many video encoders in generating AVC(H.264) bit streams. Decoding the entropy layer of AVC(H.264)-coded data streams can be computationally intensive and may present challenges for devices that decode AVC (H.264)-coded bit streams using general purpose microprocessors. For this reason, many systems use a hardware decoder accelerator.

In addition to Entropy Decoding 706, the VCL decoding process 704 may involve inverse quantization (IQ) and/or inverse discrete cosine transformation (IDCT) as indicated at 708. These processes may decode the headers 709 and data from macroblocks. The decoded headers 709 may be used to assist in VCL decoding of neighboring macroblocks. In embodiments where the ROI parameters are encoded the decoded headers may contain ROI parameters.

VCL decoding 704 may be implemented at a macroblock level data dependency frequency. Specifically, different macroblocks within the same slice may undergo VCL decoding in parallel and the results may be sent to the motion vector reconstruction task group 710 for further processing.

According to aspects of the present disclosure, the shown decoding method differentiates between Motion information temporal down sampling and Frame rate temporal down sampling at 729. In some embodiments of the present disclosure temporal down sampling types may be differentiates by for example and without limitation a bit identifier in the metadata or in the temporal down sampling interval information 727. Additionally it should be evident that either decoders with only motion information temporal down sampling decoding capability or only frame rate temporal down sampling decoding capability are possible. In embodiments with limited decoding capability, only path MV would be present in the decoder for embodiments with only motion information temporal down sampling decoding capability. Likewise, for embodiments with only Frame rate down sampling decoding capability only path Frame Rate is present Subsequently, all macroblocks in the picture or section may undergo motion vector reconstruction 710. The MV reconstruction process 710 may involve motion vector reconstruction 712 using headers from a given macroblock 711 and/or co-located macroblock headers 713. A motion vector describes apparent motion within a picture. Such motion vectors allow reconstruction of a picture (or portion thereof) based on knowledge of the pixels of a prior picture and the relative motion of those pixels from picture to picture. Once the motion vector has been recovered, pixels may be reconstructed at 716 using a process based on residual pixels from the VCL decoding process 704 and motion vectors from the MV reconstruction process 710. The data dependency frequency (and level of parallelism) for the MV depends on whether the MV reconstruction process 710 involves co-located macroblocks from other pictures. For MV reconstruction not involving co-located MB headers from other pictures, the MV reconstruction process 710 may be implemented in parallel at the slice level or picture level. For MV reconstruction, involving co-located MB headers the data dependency frequency is at the picture level and the MV reconstruction process 710 may be implemented with parallelism at the slice level.

Pictures subject to temporal down sampling of motion information, lack motion information in areas outside the ROI for frames in the temporal down sampling interval between the beginning and end frames for the interval. Thus during the MV reconstruction process 710 motion vectors must be generated for frames in the temporal down sampling interval. Generation of motion vectors for these frames may use the temporal down sampling interval information 727 to determine the beginning and end frames. As discussed above the beginning and end frames of the temporal down sampling interval retain their motion information. The motion reconstruction process may be configured to interpolate between the motion vectors of the beginning and end frames in the temporal down sampling interval. The interpolation may be adjusted to account for the number of frames in the temporal down sampling interval. Additionally the temporal down sampling interval information 727 may indicate additional frames that retain their motion information in the temporal down sampling interval, the motion information of these frames may be used further refine the fit of the interpolation. The interpolation, as discussed above may be for example and without limitation linear interpolation.

The ROI parameters may be used by used by the motion vector reconstruction 710 to locate the motion ROI within the frame. As discussed above the ROI retains its motion vectors and therefore an accurate reconstruction of the ROI is always possible. During motion vector reconstruction, the motion vectors of the ROI may be combined with the motion vectors generated by interpolation. The ROI parameters assist in locating the ROI motion vectors within the frame.

One problem during motion vector generation is that the actual location of a sample may move off the screen or otherwise change. In this case, unwanted image effects may occur on the edges of objects. In this case, residuals may be generated during encoding and used to identify and correct problematic areas during reconstruction. By way of example and not by way of limitation, for in loop down/up sampling, the encoder's local decoder performs the same up sampling as the decoder. The encoder will calculate residual pixels according to the decoder up sampling result. If the encoder detects up sampling gaps on the edges of objects, the encoder will encode on the edge residual pixels with higher quality to cover such unwanted up sampling effects.

The results of motion vector reconstruction 710 are sent to the picture reconstruction task group 714, which may be parallelized on a picture frequency level. Within the picture reconstruction task group 714 all macroblocks in the picture or section may undergo pixel prediction and reconstruction 716 in conjunction with de-blocking 720. The pixel prediction and reconstruction task 716 and the de-blocking task 720 may be parallelized to enhance the efficiency of decoding. These tasks may be parallelized within the picture reconstruction task group 714 at a macroblock level based on data dependencies. For example, pixel prediction and reconstruction 716 may be performed on one macroblock and followed by de-blocking 720. Reference pixels from the decoded picture obtained by de-blocking 720 may be used in pixel prediction and reconstruction 716 on subsequent macroblocks. Pixel prediction and reconstruction 718 produces decoded sections 719 (e.g. decoded blocks or macroblocks) that include neighbor pixels which may be used as inputs to the pixel prediction and reconstruction process 718 for a subsequent macroblock. The data dependencies for pixel prediction and reconstruction 716 allow for a certain degree of parallel processing at the macroblock level for macroblocks in the same slice.

The post processing task group 720 may include a de-blocking filter 722 that is applied to blocks in the decoded section 719 to improve visual quality and prediction performance by smoothing the sharp edges, which can form between blocks when block coding techniques are used. The de-blocking filter 722 may be used to improve the appearance of the resulting de-blocked sections 724.

The decoded section 719 or de-blocked sections 724 may provide neighboring pixels for use in de-blocking a neighboring macroblock. In addition, decoded sections 719 including sections from a currently decoding picture may provide reference pixels for pixel prediction and reconstruction 718 for subsequent macroblocks. It is during this stage that pixels from within the current picture may optionally be used for pixel prediction within that same current picture as described above, independent of whether the picture (or subsections thereof) is inter-coded or intra-coded. De-blocking 720 may be parallelized on a macroblock level for macroblocks in the same picture.

The decoded sections 719 produced before post processing 720 and the post-processed sections 724 may be stored in the same buffer, e.g., the decoded picture buffer 725 depending on the particular codec involved. It is noted that de-blocking is a post processing filter in H.264. H.264 uses pre-de-blocking macroblock as reference for neighboring macroblocks' intra prediction and post-de-blocking macroblocks for future picture macroblocks inter prediction. Because both pre- and post-de-blocking pixels are used for prediction, the decoder or encoder has to buffer both pre-de-blocking macroblocks and post-de-blocking macroblocks. For most low cost consumer applications, pre-de-blocked pictures and post-de-blocked pictures share the same buffer to reduce memory usage. For standards that pre-date H.264, such as MPEG2 or MPEG4 except MPEG4 part 10, (note: H.264 is also called MPEG4 part 10), only pre-post-processing macroblocks (e.g., pre-de-blocking macroblocks) are used as reference for other macroblock prediction. In such codecs, a pre-filtered picture may not share the same buffer with a post filtered picture.

For embodiments that include frame rate temporal down sampling, after processing one or more areas outside the ROI of the beginning and ending pictures in the temporal down sampling interval are interpolated 726. As noted above, out-of-loop up sampling is after the whole uncompressing process is done. The interpolation is used to generate luma and chroma values for areas outside the ROI that are missing luma and chroma values due to temporal down sampling. The ROI parameters may be used to locate the ROI in the frame. The temporal down sampling interval may be used to determine the number of frames that are missing chroma and luma information in one or more areas outside the ROI due to frame rate temporal down sampling. During the interpolation step 726, the temporal down sampling interval may be used to create an accurate fitting interpolation.

Once images for the one or more areas outside the ROI have been generated the actual images inside the ROI, generated by the decoding process may be combined. The placement of the images inside the ROI may be guided by the ROI parameters 727 to generate the finished picture 728. For pictures that were subject to motion information temporal down sampling the finished picture 728, may be generated after the decoding process without interpolation. The finished picture 728 may be stored in an output buffer.

For H.264, after pixel decoding, the decoded section 719 is saved in the decoded picture buffer 725. Later, the post processed sections 724 replace the decoded sections 719 in the decoded picture buffer 725 before interpolation 726. For non-H.264 cases, the decoder only saves decoded sections 719 in the decoded picture buffer 725. The interpolation 726 is done at display time and the up-sampled output 728 may not share the same buffer as the decoded picture buffer 725. Information about encoder/decoder programs may be found in published application 2018/0007362, the contents of which are incorporated by reference.

ROI determination

Regions of Interest represent portions of the screen space that are determined by an application to be important to the viewer and are therefore allocated a greater share of available graphics computation resources. ROI data may include information identifying a location of a centroid of the foveal region in the screen space, a size of the foveal region relative to the screen space, and shape of the foveal region. An ROI may be determined by an application to be of interest to a viewer because (a) it is a region the viewer is likely look at, (b) it is a region the viewer is actually looking at, or (c) it is a region it is desired to attract the user to look at.

With respect to (a), the foveal region may be determined to be likely to be looked at in a context sensitive manner. In some implementations, the application may determine that certain portions of the screen space or certain objects in a corresponding three-dimensional virtual space are "of interest" and such objects may be consistently drawn using a greater number of vertices than other objects in the virtual space. Foveal regions may be contextually defined to be of interest in a static or dynamic fashion. As a non-limiting example of static definition, a foveal region may be a fixed part of the screen space, e.g., a region near the center of the screen, if it is determined that this region is the part of the screen space that a viewer is most likely to look at. For example, if the application is a driving simulator that displays an image of a vehicle dashboard and a windshield, the viewer is likely to be looking at these portions of the image. In this example, the foveal region may be statically defined in the sense that the region of interest is a fixed portion of the screen space. As a non-limiting example of dynamic definition, in a video game a user's avatar, fellow gamer's avatars, enemy artificial intelligence (AI) characters, certain objects of interest (e.g., the ball in a sports game) may be of interest to a the user. Such objects of interest may move relative to the screen space and therefore the foveal region may be defined to move with the object of interest.

With respect to (b) it is possible to track the viewers gaze to determine which portion of a display the viewer is looking at. Tracking the viewer's gaze may be implemented by tracking some combination of the user's head pose and the orientation of the pupils of the user's eyes. Some examples of such gaze tracking are described e.g., in U.S. Patent Application Publications Numbers 2015/0085250, 2015/0085251, and 2015/0085097, the entire contents of all of which are incorporated herein by reference. Further details of estimation of head pose can be found, e.g., in "Head Pose Estimation in Computer Vision: A Survey" by Erik Murphy, in IEEE TRANSACTIONS ON PATTERN ANALYSIS AND MACHINE INTELLIGENCE, Vol. 31, No. 4, April 2009, pp 607-626, the contents of which are incorporated herein by reference. Other examples of head pose estimation that can be used in conjunction with embodiments of the present invention are described in "Facial feature extraction and pose determination", by Athanasios Nikolaidis Pattern Recognition, Vol. 33 (Jul. 7, 2000) pp. 1783-1791, the entire contents of which are incorporated herein by reference. Additional examples of head pose estimation that can be used in conjunction with embodiments of the present invention are described in "An Algorithm for Real-time Stereo Vision Implementation of Head Pose and Gaze Direction Measurement", by Yoshio Matsumoto and Alexander Zelinsky in FG '00 Proceedings of the Fourth IEEE International Conference on Automatic Face and Gesture Recognition, 2000, pp 499-505, the entire contents of which are incorporated herein by reference. Further examples of head pose estimation that can be used in conjunction with embodiments of the present invention are described in "3D Face Pose Estimation from a Monocular Camera" by Qiang Ji and Ruong Hu in Image and Vision Computing, Vol. 20, Issue 7, 20 Feb. 2002, pp 499-511, the entire contents of which are incorporated herein by reference.

With respect to (c), it is a common cinematic device to change the depth of focus of a scene to focus on a portion of interest, e.g., a particular actor who is speaking. This is done to draw the viewer's attention to the portion of the image that is in focus. According to aspects of the present disclosure, a similar effect may be implemented with computer graphics by moving the foveal region to a desired portion of the screen so that that portion has a greater density of vertices and is rendered in greater detail as a result.

There are a number of techniques for eye tracking, also known as gaze tracking. Techniques for eye gaze tracking and selective rendering compression are described in published application 2017/0285736, the contents of which are incorporated by reference herein. Some of these techniques determine a user's gaze direction from the orientation of the pupils of the user's eyes. Some known eye gaze tracking techniques involve illuminating the eyes by emitting light from one or more light sources and detecting reflections of the emitted light off of the corneas with a sensor. Typically, this is accomplished using invisible light sources in the infrared range and capturing image data (e.g., images or video) of the illuminated eyes with an infrared sensitive camera. Image processing algorithms are then used to analyze the image data to determine eye gaze direction.

Generally, eye tracking image analysis takes advantage of characteristics distinctive to how light is reflected off of the eyes to determine eye gaze direction from the image. For example, the image may be analyzed to identify eye location based on corneal reflections in the image data, and the image may be further analyzed to determine gaze direction based on a relative location of the pupils in the image.

Two common gaze tracking techniques for determining eye gaze direction based on pupil location are known as Bright Pupil tracking and Dark Pupil tracking. Bright Pupil tracking involves illumination of the eyes with a light source that is substantially in line with the optical axis of the camera, causing the emitted light to be reflected off of the retina and back to the camera through the pupil. The pupil presents in the image as an identifiable bright spot at the location of the pupil, similar to the red eye effect which occurs in images during conventional flash photography. In this method of gaze tracking, the bright reflection from pupil itself helps the system locate the pupil if contrast between pupil and iris is not enough.

Dark Pupil tracking involves illumination with a light source that is substantially off line from the optical axis of the camera, causing light directed through the pupil to be reflected away from the optical axis of the camera, resulting in an identifiable dark spot in the image at the location of the pupil. In alternative Dark Pupil tracking systems, an infrared light source and cameras directed at eyes can look at corneal reflections. Such camera based systems track the location of the pupil and corneal reflections which provides parallax due to different depths of reflections gives additional accuracy.

Figure 8A:
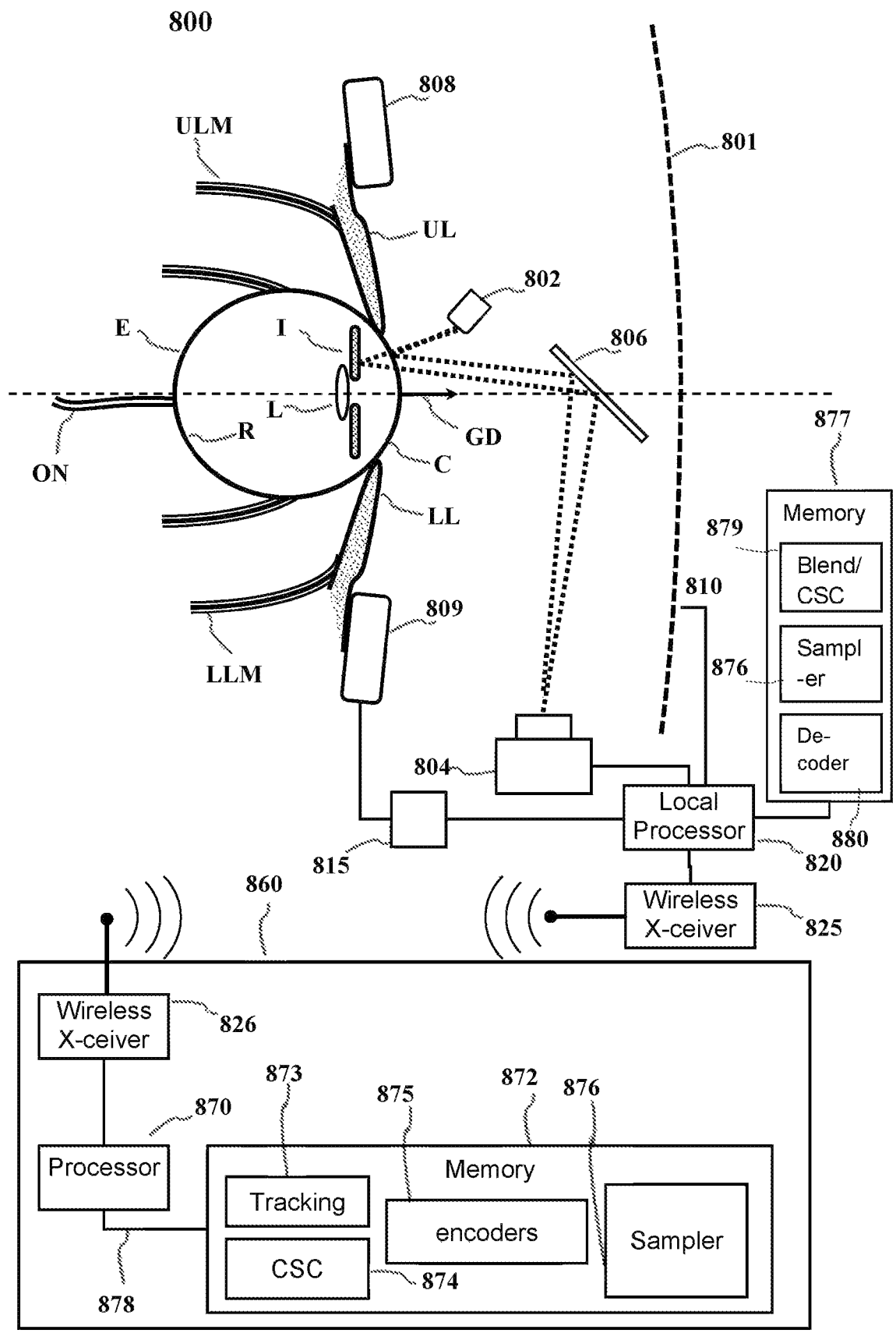
FIG. 8A depicts an example of a dark pupil gaze tracking system that may be used in the context of the present disclosure.

FIG. 8A depicts an example of a dark pupil gaze tracking system 800 that may be used in the context of the present disclosure. The gaze tracking system tracks the orientation of a user's eye E relative to a display screen 801 on which visible images are presented. While a display screen is used in the example system of FIG. 8A, certain alternative embodiments may utilize an image projection system capable of projecting images directly into the eyes of a user. In these embodiments, the user's eye E would be tracked relative to the images projected into the user's eyes. In the example of FIG. 8A, the eye E gathers light from the screen 801 through a variable iris I and a lens L projects an image on the retina R. The opening in the iris is known as the pupil. Muscles control rotation of the eye E in response to nerve impulses from the brain. Upper and lower eyelid muscles ULM, LLM respectively control upper and lower eyelids UL, LL in response to other nerve impulses.

Light sensitive cells on the retina R generate electrical impulses that are sent to the user's brain (not shown) via the optic nerve ON. The visual cortex of the brain interprets the impulses. Not all portions of the retina R are equally sensitive to light. Specifically, light-sensitive cells are concentrated in an area known as the fovea.

The illustrated image tracking system includes one or more infrared light sources 802, e.g., light emitting diodes (LEDs) that direct non-visible light (e.g., infrared light) toward the eye E. Part of the non-visible light reflects from the cornea C of the eye and part reflects from the iris. The reflected non-visible light is directed toward a suitable sensor 804 (e.g., an infrared camera) by a wavelength-selective mirror 806. The mirror transmits visible light from the screen 801 but reflects the non-visible light reflected from the eye.

The sensor 804 is preferably an image sensor, e.g., a digital camera that can produce an image of the eye E which may be analyzed to determine a gaze direction GD from the relative position of the pupil. This image may be produced with a local processor 820 or via the transmission of the obtained gaze tracking data to a remote computing device 860. The local processor 820 may be configured according to well-known architectures, such as, e.g., single-core, dual-core, quad-core, multi-core, processor-coprocessor, cell processor, and the like. The image tracking data may be transmitted between the sensor 804 and the remote computing device 860 via a wired connection (not shown), or wirelessly between a wireless transceiver 825 included in the eye tracking device 810 and a second wireless transceiver 826 included in the remote computing device 860. The wireless transceivers may be configured to implement a local area network (LAN) or personal area network (PAN), via a suitable network protocol, e.g., Bluetooth, for a PAN.

The gaze tracking system 800 may also include an upper sensor 808 and lower sensor 809 that are configured to be placed, for example, respectively above and below the eye E. Sensors 808 and 809 may be independent components, or may alternatively be part of a component 810 worn on the user's head that may include, but is not limited to, any combination of the sensor 804, local processor 820, or inertial sensor 815 described below. In the example system shown in FIG. 1A, sensors 808 and 809 are capable of collecting data regarding the electrical impulses of the nervous system and/or the movement and/or vibration of the muscular system from those areas surrounding the eye E. This data may include for example, electrophysiological and/or vibrational information of the muscles and/or nerves surrounding the eye E as monitored by the upper sensor 808 and lower sensor 809. The electrophysiological information collected by sensors 808 and 809 may include, for example, electroencephalography (EEG), electromyography (EMG), or evoked potential information collected as a result of nerve function in the area(s) surrounding the eye E. Sensors 808 and 809 may also be capable of collecting, for example, mechanomyogram or surface electromyogram information as a result of detecting the muscular vibrations or twitches of the muscles surrounding the eye E. The sensors 808 may also be capable of collecting information related to a motion sickness response, including for example, heart rate data, electrocardiography (ECG) or Galvanic skin response data. The data collected by sensors 808 and 809 may be delivered with the image tracking data to the local processor 820 and/or the remote computing device 860 as described above.

The gaze tracking system 800 may also be capable of tracking a user's head. Head tracking may be performed by an inertial sensor 815 capable producing signals in response to the position, motion, orientation or change in orientation of the user's head. This data may be sent to the local processor 820 and/or transmitted to the remote computing device 860. The inertial sensor 815 may be an independent component, or may alternatively be part of a component 810 worn on the user's head that may include, but is not limited to, any combination of the sensor 804, local processor 820, or sensors 808 and 809 described above. In alternative embodiments, head tracking may be performed via the tracking of light sources on the component 810. The gaze tracking system 800 may also include one or more memory units 877 (e.g., random access memory (RAM), dynamic random access memory (DRAM), Read only memory (ROM) and the like.

The local processor 820 may be configured to receive encoded data from the network connection 825. The local processor 820 may be operatively coupled to the one or more memory units 877 and configured to execute one or more programs stored on the memory units 877. The execution of such programs may cause the system to decode a video stream from the remote computing device 860 and generate video with a high fidelity ROI for display on the display 801. By way of example and not by way of limitation the programs may include a Blender/Conversion Space Configuration program 879, a temporal up-sampler/down-sampler program 876 and a decoder program. 880.

The remote computing device 860 may be configured to operate in coordination with the eye tracking device 810 and the display screen 801, in order to perform eye gaze tracking and determine lighting conditions in accordance with aspects of the present disclosure. The computing device 860 may include one or more processor units 870, which may be configured according to well-known architectures, such as, e.g., single-core, dual-core, quad-core, multi-core, processor-coprocessor, cell processor, and the like. The computing device 860 may also include one or more memory units 872 (e.g., random access memory (RAM), dynamic random access memory (DRAM), read-only memory (ROM), and the like).

The processor unit 870 may execute one or more programs, portions of which may be stored in the memory 872, and the processor 870 may be operatively coupled to the memory 872, e.g., by accessing the memory via a data bus 878. The programs may be configured to perform eye gaze tracking and determine lighting conditions for the system 800. By way of example, and not by way of limitation, the programs may include gaze tracking programs 873, the execution of which may cause the system 800 to track a user's gaze, e.g., as discussed above, Color space conversion programs (CSC) 874 that convert the video frame stream to a form that can be presented by a display device, Encoder programs 875, and video stream Temporal up-sampler/down-sampler programs 876 the execution of which encodes a stream video frames with temporally down-sampled sections and selected original sections of the video frames with intact motion information or chroma and luma information to be sent to the display where the encoded video frames are decoded and the down-sampled section are generated before display.

By way of example, and not by way of limitation, the gaze tracking programs 873 may include processor executable instructions which cause the system 800 to determine one or more gaze tracking parameters of the system 800 from eye tracking data gathered with the image sensor 804 and eye movement data gathered from the upper and lower sensors 808 and 809, respectively, while light is emitted from the lighting source 802. The gaze tracking programs 873 may also include instructions which analyze images gathered with the image sensor 804 in order to detect a presence of a change in lighting conditions.

Figure 8B:
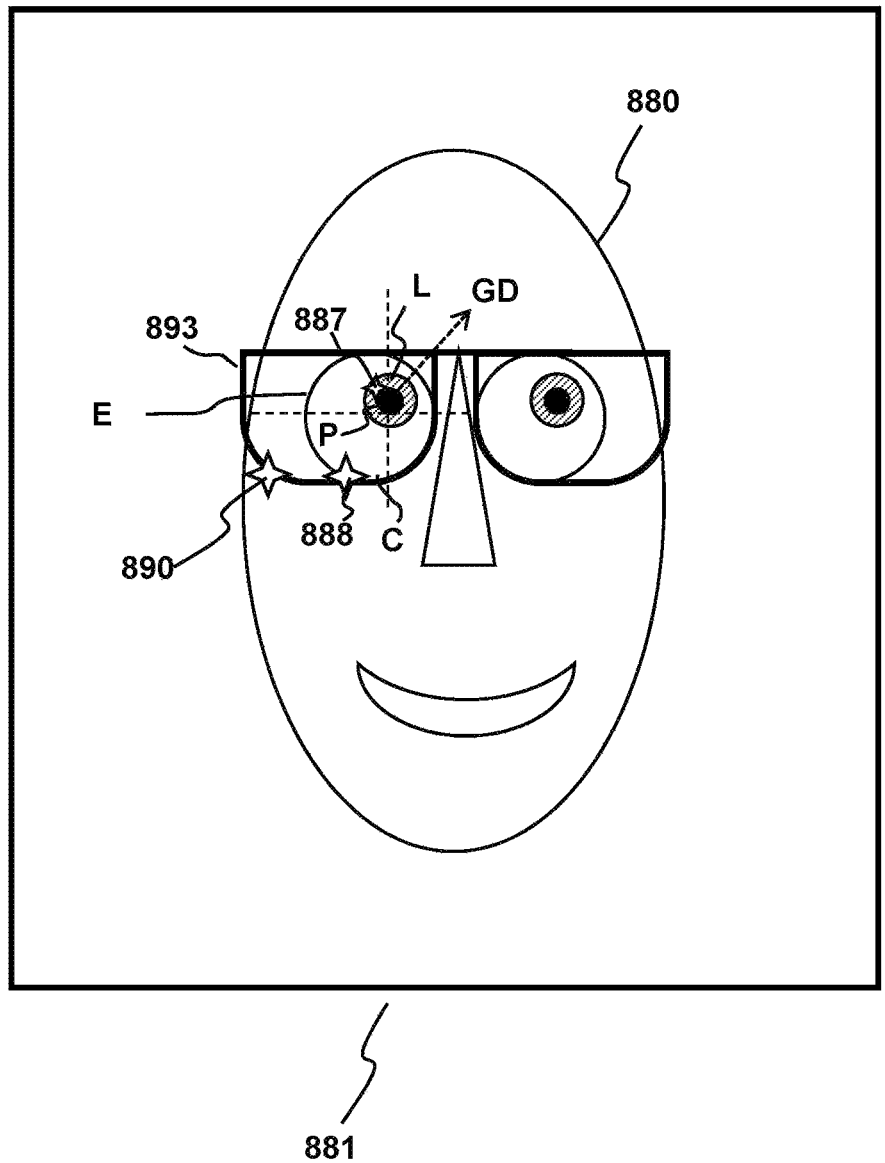
FIG. 8B shows eye tracking for determination of regions of interest according to aspects of the present disclosure.

As seen in FIG. 8B, the image 881 showing a user's head H may be analyzed to determine a gaze direction GD from the relative position of the pupil. For example, image analysis may determine a 2-dimensional offset of the pupil P from a center of the eye E in the image. The location of the pupil relative to the center may be converted to a gaze direction relative to the screen 801, by a straightforward geometric computation of a three-dimensional vector based on the known size and shape of the eyeball. The determined gaze direction GD is capable of showing the rotation and acceleration of the eye E as it moves relative to the screen 801.

As also seen in FIG. 8B, the image may also include reflections 887 and 888 of the non-visible light from the cornea C and the lens L, respectively. Since the cornea and lens are at different depths, the parallax and refractive index between the reflections may be used to provide additional accuracy in determining the gaze direction GD. An example of this type of eye tracking system is a dual Purkinje tracker, wherein the corneal reflection is the first Purkinje Image and the lens reflection is the 4th Purkinje Image. There may also be reflections 190 from a user's eyeglasses 893, if these are worn a user.

Current HMD panels refresh at a constant rate of 90 or 120 Hertz (Hz) depending on the manufacturer. The high refresh rate increases power consumption of the panel and bandwidth requirements of the transmission medium to send frame updates. Information about gaze-tracking devices with foveated view and scaled encoding can be found in co-pending application Ser. No. 15/840,893, which has been published as U.S. Patent Application Publication Number 20180192058, the contents of which are incorporated by reference.

Implementation

Figure 9:
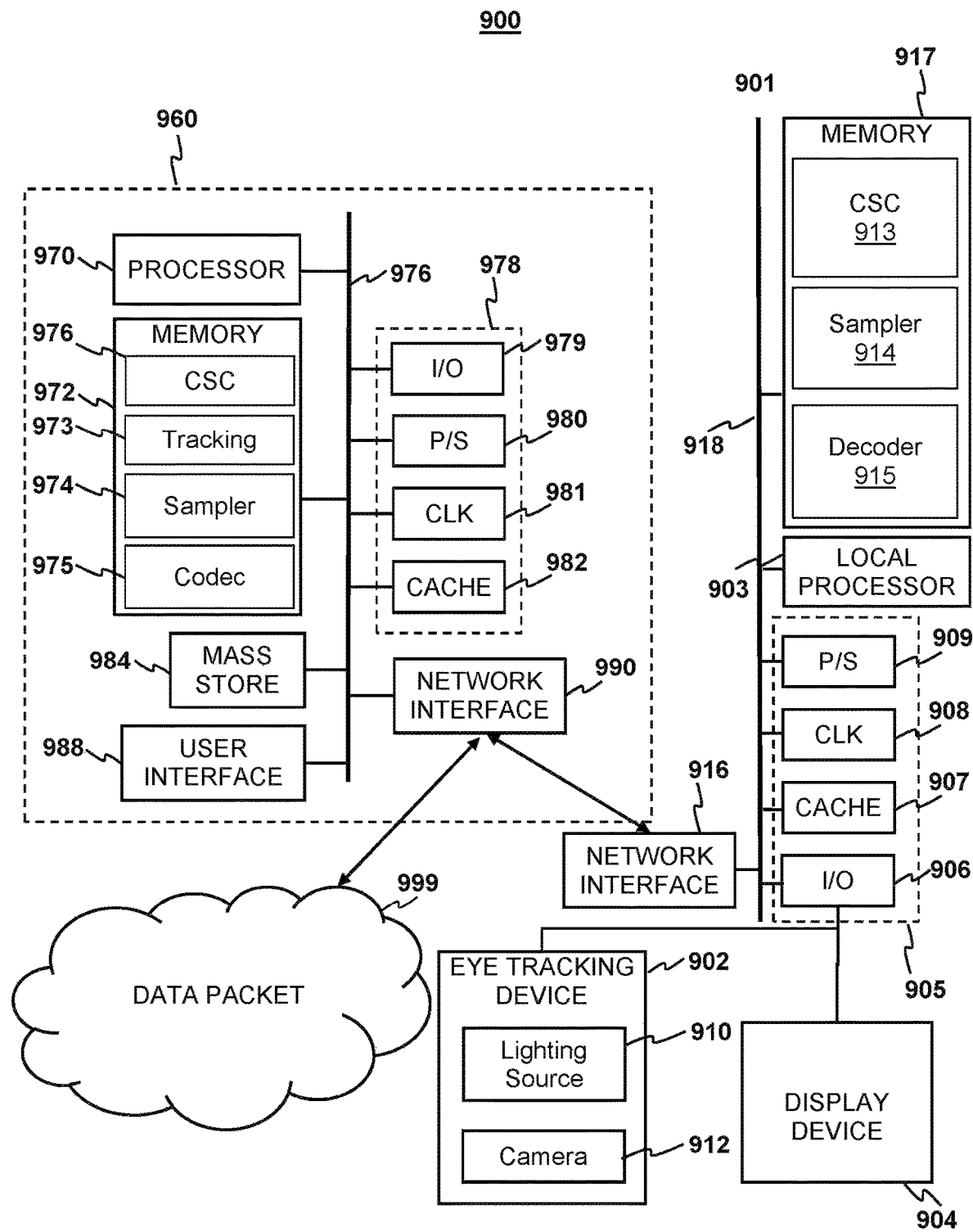
FIG. 9 depicts an example system for encoding or decoding with temporal down sampling according to aspects of the present disclosure.

FIG. 9 depicts an example system 900 to further illustrate various aspects of the present disclosure. The system 900 may include a computing device 960 which is coupled to an eye tracking display system 901. The eye tracking display device 901 comprises, a local processor 903, local memory 917, well known support circuits 905, a network interface 916, an eye tracking device 902 and a display device 904 in order to perform eye gaze tracking and/or calibration for eye tracking in accordance with aspects of the present disclosure. The display device 904 may be in the form of a cathode ray tube (CRT), flat panel screen, touch screen, or other device that displays text, numerals, graphical symbols, or other visual objects. The local processor 903 may be configured according to well-known architectures, such as, e.g., single-core, dual-core, quad-core, multi-core, processor-coprocessor, cell processor, and the like. The eye tracking display system 901 may also include one or more memory units 917 (e.g., random access memory (RAM), dynamic random access memory (DRAM), read-only memory (ROM), and the like).

The local processor unit 903 may execute one or more programs, portions of which may be stored in the memory 917, and the processor 903 may be operatively coupled to the memory 917 e.g., by accessing the memory via a data bus 918. The programs may be configured to create a video with a high fidelity ROI for the eye tracking display system 901. By way of example, and not by way of limitation, the programs may include a CSC 913, a video temporal up-sampler/down-sampler program 914, and decoder programs 915. By way of example, and not by way of limitation, CSC 913 may include processor executable instructions which cause the system 901 to format a regenerated video stream received from the temporal up-sampler/down-sampler program 914 create a video with a high fidelity ROI for display on the display device according to the above described methods 904. The sampler 914 may contain instruction that when executed cause the local processor to interpolate between a beginning frame and end frame in areas outside the ROI for video frames in a downs sampling interval and combine ROI image data with interpolated image data to regenerate a video stream, received from the decoder 915. The decoder program 915 may contain instruction when executed by the local processor that causes the system to receive and decode encoded video stream data from the network interface 916. The decoder programs alternately may be implemented as discrete logical units (not shown) communicatively coupled to the local processor by e.g. the main bus 918. According to aspects of the present disclosure, eye tracking display device 901 may be an embedded system, mobile phone, personal computer, tablet computer, portable game device, workstation, game console, head mounted display device and the like. Moreover, the computing device 960 may also be an embedded system, mobile phone, personal computer, tablet computer, portable game device, workstation, game console, and the like.

The eye tracking display device 901 may be coupled to the computing device 960, and may include a dynamic lighting source 910 similar to light sources 910 of FIGS. 8A-8B. By way of example, and not by way of limitation, the lighting source 910 may be an invisible lighting source in the form of one or more infrared LEDs, which may be configured to illuminate a user's eyes in order to gather eye tracking data with the sensor 912. The sensor 912 of the eye tracking device may be a detector, which is sensitive to light emitted from the light source 910. For example, the sensor 912 may be a camera sensitive to the light source such as an infrared camera, and the camera 912 may be positioned relative to the eye tracking device and the lighting source so that it may capture images of an area illuminated by the lighting source 910.

The computing device 960 may be configured to operate in coordination with the eye tracking display system 901, in order to perform eye gaze tracking and determine lighting conditions in accordance with aspects of the present disclosure. The computing device 960 may include one or more processor units 970, which may be configured according to well-known architectures, such as, e.g., single-core, dual-core, quad-core, multi-core, processor-coprocessor, cell processor, and the like. The computing device 960 may also include one or more memory units 972 (e.g., random access memory (RAM), dynamic random access memory (DRAM), read-only memory (ROM), and the like).

The processor unit 970 may execute one or more programs, portions of which may be stored in the memory 972, and the processor 970 may be operatively coupled to the memory 972, e.g., by accessing the memory via a data bus 976. The programs may be configured to perform eye gaze tracking and determine lighting conditions for the system 900. By way of example, and not by way of limitation, the programs may include gaze tracking programs 973, execution of which may cause the system 900 to track a user's gaze. By way of example, and not by way of limitation, the gaze tracking programs 973 may include processor executable instructions which cause the system 900 to determine one or more gaze tracking parameters of the system 900 from eye tracking data gathered with the camera 912 while light is emitted from the dynamic lighting source 910. The gaze tracking programs 973 may also include instructions which analyze images gathered with the camera 912, e.g., as described above with respect to FIG. 8B. The gaze tracking programs alternately may be implemented as discrete logical units (not shown) communicatively coupled to the local processor by e.g. the main bus 918.

In some implementations, the gaze tracking program 973 may analyze gaze tracking information to predict periods in which the user's visual percept is obscured, e.g., during blinks, or inactive, e.g., during saccades. Predicting the onset of such periods can be used to reduce unnecessary rendering computations, power consumption and network bandwidth usage. Examples of such techniques are described in commonly-assigned U.S. patent application Ser. No. 15/086,953, filed Mar. 31, 2016, the entire contents of which are incorporated herein by reference.

The computing device 960 and the eye tracking display device 901 may also include well-known support circuits 978 905, such as input/output (I/O) circuits 979 906, power supplies (P/S) 980 909, a clock (CLK) 981 908, and cache 982 907, which may communicate with other components of the system, e.g., via the bus 976 918, respectively. The computing device 960 may include a network interface 990 to facilitate communication with similarly configured network interface 916 on the eye tracking display device 901. The processor units 970 903 and network interfaces 990 916 may be configured to implement a local area network (LAN) or personal area network (PAN), via a suitable network protocol, e.g., Bluetooth, for a PAN. The computing device 960 may optionally include a mass storage device 984 such as a disk drive, CD-ROM drive, tape drive, flash memory, or the like, and the mass storage device 984 may store programs and/or data. The computing device 960 may also include a user interface 988 to facilitate interaction between the system 900 and a user. The user interface 988 may include a keyboard, mouse, light pen, game control pad, touch interface, or other device. In alternative embodiment the user interface 988 may also include a display screen and the computing device 960 may have the encoder/decoder (Codec) 975 decode an encoded video stream in data packets 999 from a network, the temporal up-sampler/down-sampler program 974 may interpolate between a beginning frame and end frame in areas outside the ROI for video frames in a downs sampling interval and combine ROI image data with interpolated image data to regenerate image frames of the video stream. As described above, the CSC program 976 may take the up sampled video screen and configure it for display on the display screen coupled to the user interface 988. For example, the CSC could convert an input image from one color format to another color format (e.g., from RGB to YUV or vice versa) prior to encoding. In this embodiment, the head tracker may not be present and the ROI location may be determined by predictive methods described above. In other embodiments, the head tracker may be present but a display screen may not be coupled to the tracking device. In other embodiments, the encoder may transmit encoded video stream data and ROI parameters through the network interface 916, which will be received and processed by the decoder program 915.

The system 900 may also include a controller (not pictured) which interfaces with the eye tracking display device 901 in order to interact with programs executed by the processor unit 970. The system 900 may also execute one or more general computer applications (not pictured), such as a video game or video stream, which may incorporate aspects of eye gaze tracking as sensed by the tracking device 902 and processed by the tracking programs 993, CSC 976, temporal up-sampler/down-sampler 974 that convert the video frame data to a form that can be presented by a display device, and video stream encoder 975.

The computing device 960 may include a network interface 990, configured to enable the use of Wi-Fi, an Ethernet port, or other communication methods. The network interface 990 may incorporate suitable hardware, software, firmware or some combination thereof to facilitate communication via a telecommunications network. The network interface 990 may be configured to implement wired or wireless communication over local area networks and wide area networks such as the Internet. The network interface 990 may also include the aforementioned wireless transceiver that facilitates wireless communication with the eye tracking device 902 and display device 979. The computing device 960 may send and receive data and/or requests for files via one or more data packets 999 over a network.

Aspects of the present disclosure allow for reduced bit count during transmission of image data without loss of detail in the ROI. The reduced bit count speeds up the encoding process that produces the compressed bit stream and reduces the bandwidth required to transmit the encoded picture data. The reduced bit count advantageously reduces the time needed to encode image data without significantly increasing the time needed to decode the encoded data.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for video encoding comprising;
   a) determining one or more region of interest (ROI) parameters for pictures in a picture stream and a temporal down-sampling interval;
   b) temporally down-sampling one or more areas outside the ROI in a picture in the picture stream according to the temporal down sampling interval to generate a temporally down sampled picture;
   c) encoding the temporally down sampled picture; and
   d) transmitting the encoded temporally down sampled picture.

2. The method of claim 1, wherein temporally down sampling areas outside the ROI comprises using the ROI parameters to determine the area outside the ROI and omitting motion information for areas outside the ROI for frames inside the temporal down sampling interval.

3. The method of claim 2, wherein the motion information includes a motion vector, information identifying a reference picture to which a motion vector refers, or a section size that a motion vector covers.

4. The method of claim 1, wherein encoding the temporally down sampled picture comprises entropy encoding the picture having down sampled areas outside the ROI.

5. The method of claim 1, wherein temporally down sampling areas outside the ROI comprises using the ROI parameters to determine the one or more areas outside the ROI and decreasing the frame rate for areas outside the ROI.

6. The method of claim 5, wherein the temporal down sampling interval determines a frame rate for the areas outside the ROI.

7. The method of claim 1, wherein the temporal down sampling interval varies based on a down sampling location within the pictures and the region of interest parameters.

8. The method of claim 7, wherein the temporal down sampling interval increases as the down sampling location within the pictures moves away from a location of the ROI.

9. The method of claim 8, wherein the temporal down sampling interval increases in a linear rate as the down sampling location within the pictures moves away from a location of the ROI.

10. The method of claim 8, wherein the temporal down sampling interval increases in a non-linear rate as the down sampling location within the pictures moves away from a location of the ROI.

11. The method of claim 10, wherein the temporal down sampling interval increases in a sigmoidal function of down sampling rate to distance from ROI.

12. The method of claim 10, wherein the temporal down sampling interval increases in an exponential function of down sampling rate to distance from ROI.

13. The method of claim 1, further comprising applying a low pass filter to a picture in the picture stream during a saccade before encoding the temporally down sampled picture.

14. The method of claim 1, further comprising encoding the temporal down sampling interval and sending the temporal down sampling interval over the network.

15. The method of claim 1, further comprising applying multi-segment spatial down sampling to the area outside the ROI before encoding the temporally down sampled picture.

16. The method of claim 1, wherein the temporal down sampling interval for a particular area of the one or more areas outside the ROI depends on a distance of the particular area relative to the ROI.

17. The method of claim 1, further comprising applying multi-segment spatial down sampling to the area outside the ROI before said encoding the temporally down sampled picture.

18. A method for video decoding comprising
   a) decoding an encoded picture in an encoded picture stream;
   b) temporally up sampling areas outside an ROI of the picture from the encoded picture stream;
   c) inserting the temporally up sampled areas outside the ROI into the picture from the encoded picture stream into the decoded encoded picture stream;
   d) storing the temporally up sampled picture.

19. The method of claim 18, wherein the temporally up sampling areas outside the ROI comprises interpolating the motion information in areas outside the ROI from a beginning frame and an end frame of a temporal down sampling interval to generate motion information for areas outside the ROI for each frame in the down sampling interval.

20. The method of claim 19, wherein the motion information are motion vectors.

21. The method of claim 18, wherein the temporally up sampling areas outside the ROI comprises interpolating the areas outside the ROI between a beginning frame and an end frame of a temporal down sampling interval to generate images for areas outside the ROI for each frame in the down sampling interval.

22. The method of claim 18 further comprising decoding a down sampling interval.

23. The method of claim 18 further comprising performing multi-segment spatial up sampling after inserting the temporally up sampled areas outside the ROI into the picture.

24. The method of claim 18 further comprising storing the temporally up sampled picture in storage at e) and displaying the temporally up sampled picture on a display device.

25. The method of claim 18, further comprising performing multi-segment spatial up sampling after said inserting the temporally up sampled areas outside the ROI into the picture from the encoded picture stream into the decoded encoded picture stream.

26. A system comprising;
   a processor;
   a memory coupled to the processor;
   non-transitory instructions embedded in the memory that when executed cause the processor to perform the method for video encoding comprising a) determining one or more region of interest (ROI) parameters for pictures in a picture stream and a temporal down sampling interval;
b) temporally down sampling one or more areas outside the ROI in a picture in the picture stream according to the temporal down sampling interval to generate a temporally down sampled picture;
c) encoding the temporally down sampled picture; and
d) transmitting the encoded temporally down sampled picture.

27. The system of claim 26, wherein temporally down sampling areas outside the ROI comprises using the ROI parameters to determine the area outside the ROI and omitting motion information for areas outside the ROI for frames inside the temporal down sampling interval.

28. The system of claim 26, wherein temporally down sampling areas outside the ROI comprises using the ROI parameters to determine the one or more areas outside the ROI and decreasing the frame rate for areas outside the ROI.

29. The system of claim 26, wherein the method for video encoding further comprises applying multi-segment spatial down sampling to the area outside the ROI before said encoding the temporally down sampled picture.

30. Non-transitory instructions embedded in a computer readable medium that when executed cause a computer to carry out the method for video encoding comprising
a) determining one or more region of interest (ROI) parameters for pictures in a picture stream and a temporal down sampling interval;
b) temporally down sampling one or more areas outside the ROI in a picture in the picture stream according to the temporal down sampling interval to generate a temporally down sampled picture;
c) encoding the temporally down sampled picture; and
d) transmitting the encoded temporally down sampled picture.

31. The non-transitory instructions of claim 30, wherein temporally down sampling areas outside the ROI comprises using the ROI parameters to determine the area outside the ROI and omitting motion information for areas outside the ROI for frames inside the temporal down sampling interval.

32. The non-transitory instructions of claim 30, wherein temporally down sampling areas outside the ROI comprises using the ROI parameters to determine the one or more areas outside the ROI and decreasing the frame rate for areas outside the ROI.

33. The non-transitory instructions of claim 30, wherein the method for video encoding further comprises applying multi-segment spatial down sampling to the area outside the ROI before said encoding the temporally down sampled picture.

34. A system comprising;
a processor;
a memory coupled to the processor;
non-transitory instructions embedded in the memory that when executed cause the processor to perform the method for video decoding comprising
a) decoding an encoded picture in an encoded picture stream;
b) temporally up sampling areas outside an ROI of the picture from the encoded picture stream;
c) inserting the temporally up sampled areas outside the ROI into the picture from the encoded picture stream into the decoded encoded picture stream;
d) storing the temporally up sampled picture.

35. The system of claim 34, wherein the temporally up sampling areas outside the ROI comprises interpolating the motion information in areas outside the ROI from a beginning frame and an end frame of a temporal down sampling interval to generate motion information for areas outside the ROI for each frame in the down sampling interval.

36. The system of claim 34, wherein the temporally up sampling areas outside the ROI comprises interpolating the areas outside the ROI between a beginning frame and an end frame of a temporal down sampling interval to generate images for areas outside the ROI for each frame in the down sampling interval.

37. The system of claim 34, wherein the method for video decoding further comprises performing multi-segment spatial up sampling after said inserting the temporally up sampled areas outside the ROI into the picture from the encoded picture stream into the decoded encoded picture stream.

38. Non-transitory instructions embedded in a computer readable medium that when executed cause a computer to carry out the method for video decoding comprising
a) decoding an encoded picture in an encoded picture stream;
b) temporally up sampling areas outside an ROI of the picture from the encoded picture stream;
c) inserting the temporally up sampled areas outside the ROI into the picture from the encoded picture stream into the decoded encoded picture stream;
d) storing the temporally up sampled picture.

39. The non-transitory instructions of claim 38, wherein the temporally up sampling areas outside the ROI comprises interpolating the motion information in areas outside the ROI from a beginning frame and an end frame of a temporal down sampling interval to generate motion information for areas outside the ROI for each frame in the down sampling interval.

40. The non-transitory instructions of claim 38, wherein the temporally up sampling areas outside the ROI comprises interpolating the areas outside the ROI between a beginning frame and an end frame of a temporal down sampling interval to generate images for areas outside the ROI for each frame in the down sampling interval.

41. The non-transitory instructions of claim 38, wherein the method for video decoding further comprises performing multi-segment spatial up sampling after said inserting the temporally up sampled areas outside the ROI into the picture from the encoded picture stream into the decoded encoded picture stream.

* * * * *